United States Patent
Votaw et al.

(10) Patent No.: US 10,148,646 B2
(45) Date of Patent: *Dec. 4, 2018

(54) PREVENTING UNAUTHORIZED ACCESS TO SECURED INFORMATION SYSTEMS USING TOKENIZED AUTHENTICATION TECHNIQUES

(71) Applicant: Bank of America Corporation, Charlotte, NC (US)

(72) Inventors: Elizabeth S. Votaw, Potomac, MD (US); Andrew T. Keys, Albany, OR (US); Ashish Arora, Bellevue, WA (US)

(73) Assignee: Bank of America Corporation, Charlotte, NC (US)

( * ) Notice: Subject to any disclaimer, the term of this patent is extended or adjusted under 35 U.S.C. 154(b) by 170 days.

This patent is subject to a terminal disclaimer.

(21) Appl. No.: 15/214,874

(22) Filed: Jul. 20, 2016

(65) Prior Publication Data
US 2018/0026959 A1    Jan. 25, 2018

(51) Int. Cl.
*H04L 29/06* (2006.01)
*H04L 12/58* (2006.01)
*G06Q 50/00* (2012.01)

(52) U.S. Cl.
CPC ............ *H04L 63/083* (2013.01); *H04L 51/32* (2013.01); *H04L 63/0838* (2013.01);
(Continued)

(58) Field of Classification Search
CPC ........... H04L 2463/082; H04L 63/0815; H04L 63/0838; H04L 63/0853
See application file for complete search history.

(56) References Cited

U.S. PATENT DOCUMENTS 8,572,684 B1 * 10/2013 Sama ................. H04L 63/0838
726/2
8,955,076 B1 * 2/2015 Faibish ................. H04L 63/08
726/7
(Continued)

OTHER PUBLICATIONS

"OAuth," from Wikipedia, the free encyclopedia, accessed Jun. 22, 2016 from https://en.wikipedia.org/wiki/OAuth, 6 pages.

*Primary Examiner* — James R Turchen
(74) *Attorney, Agent, or Firm* — Banner & Witcoff, Ltd.; Michael A. Springs

(57) ABSTRACT

A computing platform may receive, from a social messaging server, a request to authenticate a user to a user account associated with a client portal. In response to receiving the request, the computing platform may send, to the social messaging server, an authentication token request message. Thereafter, the computing platform may receive, from the social messaging server, an authentication token. The computing platform may validate the authentication token received from the social messaging server. Based on validating the authentication token received from the social messaging server, the computing platform may generate a validation message directing a client support server to provide the user with access to the user account. Subsequently, the computing platform may send the validation message to the client support server, which may cause the client support server to initiate a client support session with the user via the social messaging service provided by the social messaging server.

18 Claims, 17 Drawing Sheets

(52) U.S. Cl.
CPC ......... *H04L 63/0853* (2013.01); *G06Q 50/01* (2013.01); *H04L 2463/082* (2013.01)

(56) References Cited

U.S. PATENT DOCUMENTS

| | | | |
|---|---|---|---|
| 9,137,228 B1* | 9/2015 | Newstadt | H04L 63/08 |
| 9,419,968 B1* | 8/2016 | Pei | G06F 21/31 |
| 9,774,579 B2* | 9/2017 | Oberheide | H04L 63/083 |
| 9,800,580 B2* | 10/2017 | Zhang | H04L 63/0884 |
| 9,807,087 B2* | 10/2017 | Hinton | H04L 63/0846 |
| 2008/0168543 A1* | 7/2008 | von Krogh | G06F 21/31 |
| | | | 726/6 |
| 2009/0172402 A1* | 7/2009 | Tran | G06Q 20/102 |
| | | | 713/170 |
| 2011/0197266 A1* | 8/2011 | Chu | H04L 9/3228 |
| | | | 726/5 |
| 2011/0302645 A1* | 12/2011 | Headley | H04L 9/3215 |
| | | | 726/7 |
| 2012/0066749 A1* | 3/2012 | Taugbol | G06F 21/35 |
| | | | 726/6 |
| 2013/0139222 A1* | 5/2013 | Kirillin | H04L 67/02 |
| | | | 726/4 |
| 2013/0159195 A1* | 6/2013 | Kirillin | G06Q 20/322 |
| | | | 705/71 |
| 2013/0254036 A1* | 9/2013 | Trinh | G06Q 30/0251 |
| | | | 705/14.64 |
| 2013/0297513 A1* | 11/2013 | Kirillin | G06Q 40/02 |
| | | | 705/67 |
| 2014/0040993 A1* | 2/2014 | Lorenzo | G06F 21/41 |
| | | | 726/4 |
| 2014/0208401 A1* | 7/2014 | Balakrishnan | H04L 63/08 |
| | | | 726/5 |
| 2014/0250518 A1* | 9/2014 | Schneider | G06F 21/34 |
| | | | 726/9 |
| 2014/0310514 A1* | 10/2014 | Favero | H04L 9/0869 |
| | | | 713/153 |
| 2014/0344904 A1* | 11/2014 | Venkataramani | G06F 21/35 |
| | | | 726/5 |
| 2015/0046990 A1* | 2/2015 | Oberheide | G06F 21/32 |
| | | | 726/6 |
| 2015/0161378 A1* | 6/2015 | Oberheide | G06F 21/45 |
| | | | 726/1 |
| 2015/0244706 A1* | 8/2015 | Grajek | H04L 63/0815 |
| | | | 726/6 |
| 2015/0256973 A1* | 9/2015 | Raounak | H04W 4/029 |
| | | | 726/7 |
| 2015/0304110 A1* | 10/2015 | Oberheide | H04L 63/12 |
| | | | 713/155 |
| 2016/0094528 A1* | 3/2016 | Gordon | H04L 63/08 |
| | | | 726/7 |
| 2016/0139582 A1 | 5/2016 | Matsuoka et al. | |
| 2016/0140545 A1 | 5/2016 | Flurscheim et al. | |
| 2016/0142385 A1 | 5/2016 | Robison et al. | |
| 2016/0142916 A1 | 5/2016 | Yoram et al. | |
| 2016/0148012 A1 | 5/2016 | Khitrov et al. | |
| 2016/0148196 A1 | 5/2016 | Dides et al. | |
| 2016/0148487 A1 | 5/2016 | Thomas | |
| 2016/0149417 A1 | 5/2016 | Davis et al. | |
| 2016/0154952 A1 | 6/2016 | Venkatraman et al. | |
| 2016/0155121 A1 | 6/2016 | Weiss | |
| 2016/0162854 A1 | 6/2016 | Grigg et al. | |
| 2016/0162897 A1 | 6/2016 | Feeney | |
| 2016/0162902 A1 | 6/2016 | Weiss | |
| 2016/0162903 A1 | 6/2016 | Weiss | |
| 2016/0164731 A1 | 6/2016 | Jou et al. | |
| 2016/0164748 A1 | 6/2016 | Kim | |
| 2016/0164855 A1 | 6/2016 | Johansson et al. | |
| 2016/0164858 A1 | 6/2016 | Grigg et al. | |
| 2016/0164870 A1 | 6/2016 | Grigg et al. | |
| 2016/0171486 A1 | 6/2016 | Wagner et al. | |
| 2016/0173281 A1 | 6/2016 | White et al. | |
| 2016/0173504 A1 | 6/2016 | Grigg et al. | |
| 2016/0179454 A1 | 6/2016 | Liu | |
| 2016/0180060 A1 | 6/2016 | Nelson | |
| 2016/0180078 A1 | 6/2016 | Chhabra et al. | |
| 2016/0180454 A1 | 6/2016 | Yeri et al. | |
| 2016/0182221 A1 | 6/2016 | Cucinotta et al. | |
| 2016/0182464 A1 | 6/2016 | Mintz | |
| 2016/0182476 A1 | 6/2016 | Sakumoto et al. | |
| 2016/0182613 A1 | 6/2016 | Brune et al. | |
| 2016/0185527 A1 | 6/2016 | Greyshock | |
| 2016/0188864 A1 | 6/2016 | Hillis | |
| 2016/0191484 A1 | 6/2016 | Gongaware | |
| 2016/0191487 A1 | 6/2016 | Twitchell, Jr. et al. | |
| 2016/0191488 A1 | 6/2016 | Twitchell, Jr. et al. | |
| 2016/0191499 A1 | 6/2016 | Momchilov et al. | |
| 2016/0191520 A1 | 6/2016 | Voice et al. | |
| 2016/0191715 A1 | 6/2016 | Mohammed et al. | |
| 2016/0195602 A1 | 7/2016 | Meadow | |
| 2016/0196414 A1 | 7/2016 | Stuntebeck et al. | |
| 2016/0196705 A1 | 7/2016 | Tehranchi et al. | |
| 2016/0196706 A1 | 7/2016 | Tehranchi et al. | |
| 2016/0197914 A1* | 7/2016 | Oberheide | H04L 63/0838 |
| | | | 713/183 |
| 2016/0197937 A1 | 7/2016 | Roth et al. | |
| 2016/0203292 A1 | 7/2016 | Kamen et al. | |
| 2016/0203306 A1 | 7/2016 | Boshra | |
| 2016/0203315 A1 | 7/2016 | Wentz et al. | |
| 2016/0203346 A1 | 7/2016 | Gardiner et al. | |
| 2016/0203467 A1 | 7/2016 | Khan et al. | |
| 2016/0205075 A1 | 7/2016 | Asokan et al. | |
| 2016/0205546 A1 | 7/2016 | Poon et al. | |
| 2016/0248752 A1* | 8/2016 | Blinn | H04L 63/083 |
| 2016/0269403 A1* | 9/2016 | Koutenaei | H04L 63/0861 |
| 2016/0285871 A1* | 9/2016 | Chathoth | H04L 63/0807 |
| 2016/0337344 A1* | 11/2016 | Johansson | H04L 63/0838 |
| 2016/0344730 A1* | 11/2016 | Holz | H04L 63/0876 |
| 2016/0366122 A1* | 12/2016 | Rykowski | H04L 63/0815 |
| 2016/0373430 A1* | 12/2016 | Bhat | H04L 63/0823 |
| 2017/0032111 A1* | 2/2017 | Johansson | G06F 21/31 |
| 2017/0078270 A1* | 3/2017 | Tang | H04L 63/0815 |
| 2017/0126660 A1* | 5/2017 | Brannon | H04L 63/0815 |
| 2017/0264611 A1* | 9/2017 | Alen | H04L 63/10 |
| 2017/0279795 A1* | 9/2017 | Redberg | H04L 63/0838 |

* cited by examiner

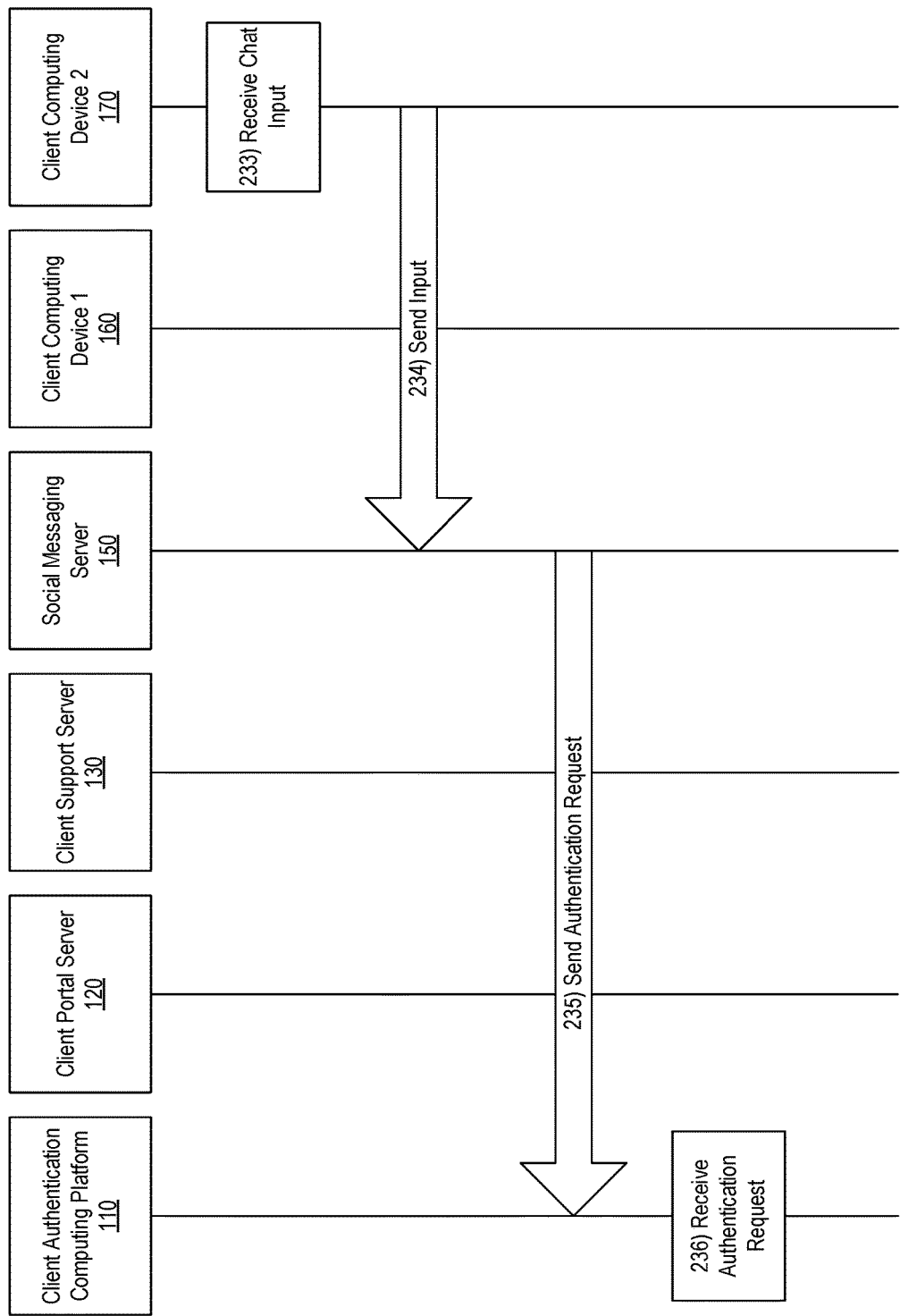

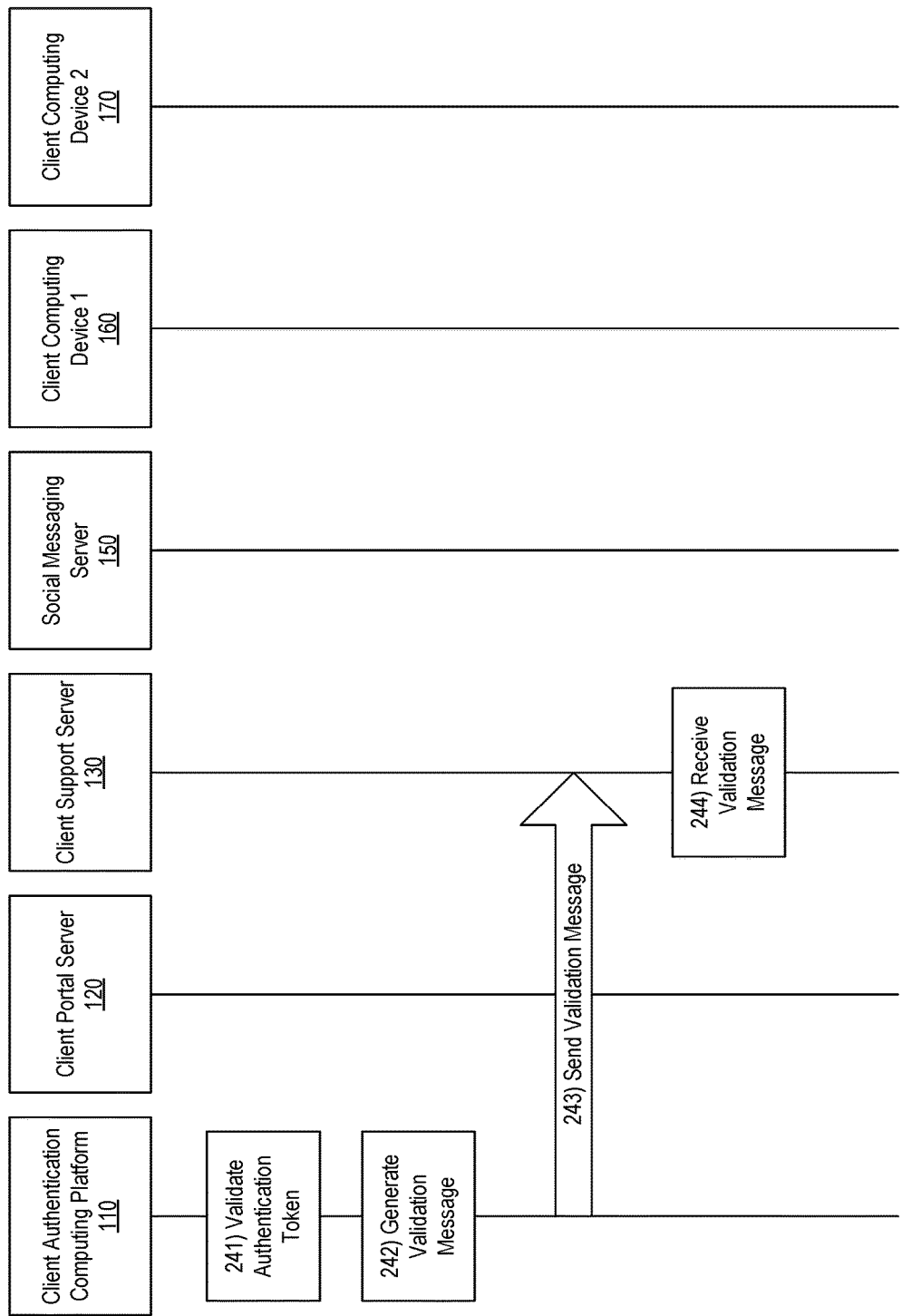

PREVENTING UNAUTHORIZED ACCESS TO SECURED INFORMATION SYSTEMS USING TOKENIZED AUTHENTICATION TECHNIQUES

BACKGROUND

Aspects of the disclosure relate to providing information security and preventing unauthorized access to resources of an information system. In particular, one or more aspects of the disclosure relate to preventing unauthorized access to secured information systems using tokenized authentication techniques.

As organizations increasingly provide electronic portals via which various users may access, view, and/or modify information, including client information, ensuring the safety and security of information maintained by such organizations and/or made available via such portals is increasingly important. In many instances, however, it may be difficult to ensure the safety and security of such information while also optimizing the efficient and effective technical operations of the computer systems that maintain such information and/or provide such portals.

SUMMARY

Aspects of the disclosure provide effective, efficient, scalable, and convenient technical solutions that address and overcome the technical problems associated with providing information security and preventing unauthorized access to resources of an information system by implementing tokenized authentication techniques.

In accordance with one or more embodiments, a computing platform having at least one processor, a memory, and a communication interface may receive, via the communication interface, and from a social messaging server, a request to authenticate a first user to a first user account associated with a client portal provided by a client portal server. Based on receiving the request to authenticate the first user to the first user account associated with the client portal provided by the client portal server, the computing platform may send, via the communication interface, and to the social messaging server, a first authentication token request message. Thereafter, the computing platform may receive, via the communication interface, and from the social messaging server, a first authentication token. Subsequently, the computing platform may validate the first authentication token received from the social messaging server. Based on validating the first authentication token received from the social messaging server, the computing platform may generate a first validation message directing a client support server to provide the first user with access to the first user account. Subsequently, the computing platform may send, via the communication interface, and to the client support server, the first validation message directing the client support server to provide the first user with access to the first user account.

In some embodiments, the first authentication token received from the social messaging server may include information indicating that the first user is authenticated to a first social messaging service account associated with a social messaging service provided by the social messaging server.

In some embodiments, the social messaging server may generate the request to authenticate the first user to the first user account associated with the client portal provided by the client portal server based on receiving chat input from a first client computing device associated with the first user.

In some embodiments, the first validation message directing the client support server to provide the first user with access to the first user account may include information indicating that the first user has been authenticated to the first user account based on the first authentication token received from the social messaging server.

In some embodiments, the first validation message directing the client support server to provide the first user with access to the first user account may include information directing the client support server to initiate a first client support session with the first user via the social messaging service provided by the social messaging server.

In some embodiments, the computing platform may receive, via the communication interface, and from the social messaging server, a request to authenticate a second user to a second user account associated with the client portal provided by the client portal server. Based on receiving the request to authenticate the second user to the second user account associated with the client portal provided by the client portal server, the computing platform may send, via the communication interface, and to the social messaging server, a second authentication token request message. Thereafter, the computing platform may receive, via the communication interface, and from the social messaging server, a second authentication token. Subsequently, the computing platform may validate the second authentication token received from the social messaging server. Based on validating the second authentication token received from the social messaging server, the computing platform may generate a second validation message directing the client support server to provide the second user with access to the second user account. Subsequently, the computing platform may send, via the communication interface, and to the client support server, the second validation message directing the client support server to provide the second user with access to the second user account.

In some embodiments, the second authentication token received from the social messaging server may include information indicating that the second user is authenticated to a second social messaging service account associated with the social messaging service provided by the social messaging server.

In some embodiments, the social messaging server may generate the request to authenticate the second user to the second user account associated with the client portal provided by the client portal server based on receiving chat input from a second client computing device associated with the second user.

In some embodiments, the second validation message directing the client support server to provide the second user with access to the second user account may include information indicating that the second user has been authenticated to the second user account based on the second authentication token received from the social messaging server.

In some embodiments, the second validation message directing the client support server to provide the second user with access to the second user account may include information directing the client support server to initiate a second client support session with the second user via the social messaging service provided by the social messaging server.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2L depict an illustrative event sequence for preventing unauthorized access to secured information systems using tokenized authentication techniques in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to dynamically initiating a chat session in response to a banking notification. For example, a bank authentication server may exchange one or more tokens with a social networking server to enable account notifications to be sent to a customer via a social networking messenger service. Subsequently, a customer may respond to a notification received via the social networking service to dynamically initiate a chat session with a bank customer service representative via the social networking messenger service.

Figure 1A:
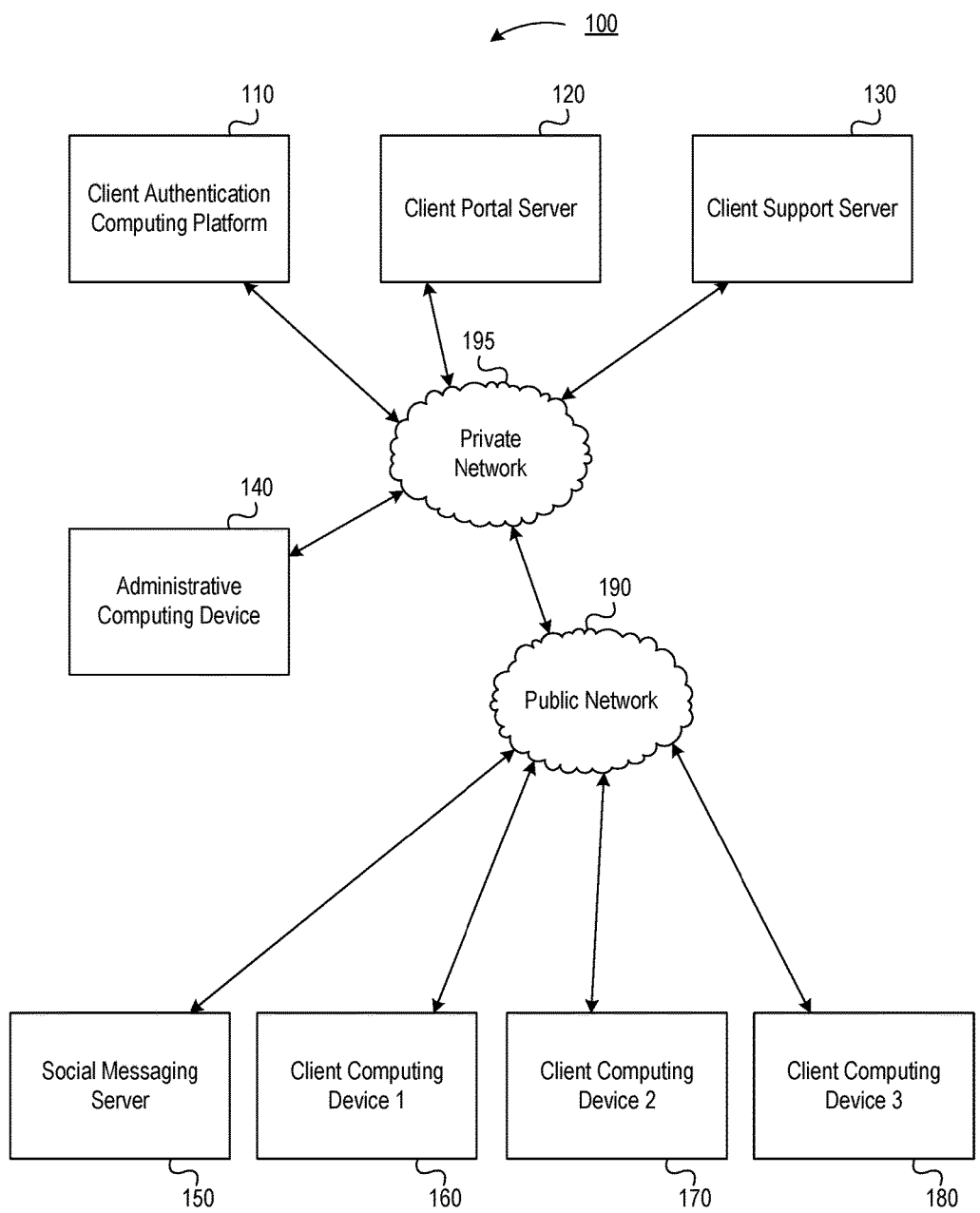
FIGS. 1A and 1B depict an illustrative computing environment for preventing unauthorized access to secured information systems using tokenized authentication techniques in accordance with one or more example embodiments.
Figure 1B:
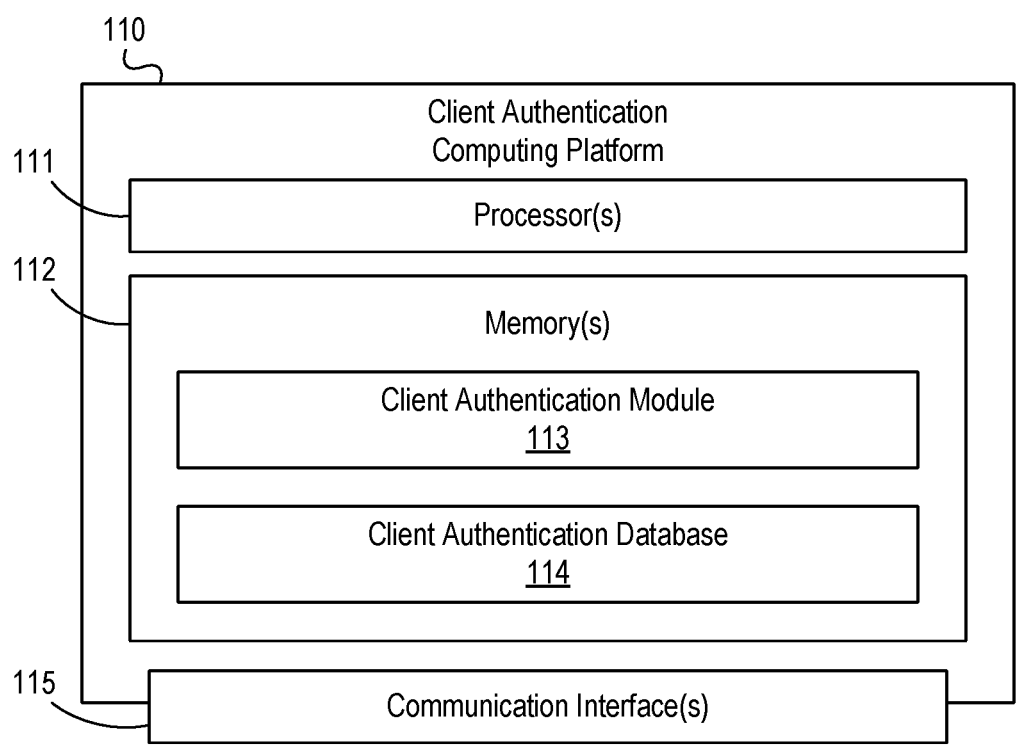

FIGS. 1A and 1B depict an illustrative computing environment for preventing unauthorized access to secured information systems using tokenized authentication techniques in accordance with one or more example embodiments. Referring to FIG. 1A, computing environment 100 may include one or more computing devices. For example, computing environment 100 may include a client portal server 120, a client support server 130, an administrative computing device 140, a social messaging server 150, a first client computing device 160, a second client computing device 170, and a third client computing device 180.

Client portal server 120 may be configured to provide one or more portal interfaces to one or more client devices. For example, client portal server 120 may be configured to provide a customer portal, such as an online banking portal, to one or more customers of an organization, such as a financial institution, who may use one or more client computing devices to access the portal, such as client computing device 160, client computing device 170, and client computing device 180, as illustrated in greater detail below. In some instances, in addition to being configured to provide an online banking portal associated with a financial institution to one or more customers of the financial institution and/or their associated computing devices, client portal server 120 also may be configured to provide a mobile banking portal associated with the financial institution to various customers of the financial institution and/or their associated mobile computing devices. Such portals may, for instance, provide customers of the financial institution with access to financial account information (e.g., account balance information, account statements, recent transaction history information, or the like) and/or may provide customers of the financial institution with menus, controls, and/or other options to schedule and/or execute various transactions (e.g., online bill pay transactions, person-to-person funds transfer transactions, or the like).

Client support server 130 may be configured to initiate and/or provide one or more client support sessions, as illustrated in greater detail below. For example, client support server 130 may include and/or integrate with one or more client support servers and/or devices, such as one or more customer service representative devices used by one or more customer service representatives of an organization (which may, e.g., be a financial institution operating client portal server 120), to connect one or more customers of the organization with one or more customer service representatives of the organization via one or more chat sessions and/or other client support sessions.

Administrative computing device 140 may be configured to provide one or more interfaces that allow for configuration and management of one or more other computing devices and/or computer systems included in computing environment 100. Social messaging server 150 may be configured to provide a social messaging service, as illustrated in greater detail below. For example, social messaging server 150 may be operated by and/or otherwise associated with a social networking service (which may, e.g., be different from and/or not associated with a financial institution and/or other organization operating client portal server 120). Social messaging server 150 may, for instance, provide one or more social messaging user interfaces to various users and/or user devices, such as client computing device 160, client computing device 170, and/or client computing device 180, as illustrated in greater detail below.

Client computing device 160 may be configured to be used by a first customer of an organization, such as a financial institution. In some instances, client computing device 160 may, for example, be registered with the organization and/or one or more computer systems in computing environment 100, such that the organization and/or the one or more computer systems maintain one or more records linking client computing device 160 to the first customer of the organization, as illustrated in greater detail below. Client computing device 170 may be configured to be used by a second customer of the organization (who may, e.g., be different from the first customer of the organization). In some instances, client computing device 170 may, for example, be registered with the organization and/or one or more computer systems in computing environment 100, such that the organization and/or the one or more computer systems maintain one or more records linking client computing device 170 to the second customer of the organization, as illustrated in greater detail below. Client computing device 180 may be configured to be used by a third customer of the organization (who may, e.g., be different from the first customer of the organization and the second customer of the organization). In some instances, client computing device 180 may, for example, be registered with the organization and/or one or more computer systems in computing environment 100, such that the organization and/or the one or more computer systems maintain one or more records linking client computing device 180 to the third customer of the organization, as illustrated in greater detail below.

In one or more arrangements, client portal server 120, client support server 130, administrative computing device 140, social messaging server 150, client computing device 160, client computing device 170, and client computing device 180 may be any type of computing device capable of receiving a user interface, receiving input via the user interface, and communicating the received input to one or more other computing devices. For example, client portal server 120, client support server 130, administrative computing device 140, social messaging server 150, client computing device 160, client computing device 170, and client computing device 180 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of client portal server 120, client support server 130, administrative computing device 140, social messaging server 150, client computing device 160, client computing device 170, and client computing device 180 may, in some instances, be special-purpose computing devices configured to perform specific functions.

Computing environment 100 also may include one or more computing platforms. For example, computing environment 100 may include client authentication computing platform 110. As illustrated in greater detail below, client authentication computing platform 110 may include one or more computing devices configured to perform one or more of the functions described herein. For example, client authentication computing platform 110 may include one or more computers (e.g., laptop computers, desktop computers, servers, server blades, or the like).

Computing environment 100 also may include one or more networks, which may interconnect one or more of client authentication computing platform 110, client portal server 120, client support server 130, administrative computing device 140, social messaging server 150, client computing device 160, client computing device 170, and client computing device 180. For example, computing environment 100 may include public network 190 and private network 195. Private network 195 and/or public network 190 may include one or more sub-networks (e.g., local area networks (LANs), wide area networks (WANs), or the like). Private network 195 may be associated with a particular organization (e.g., a corporation, financial institution, educational institution, governmental institution, or the like) and may interconnect one or more computing devices associated with the organization. For example, client authentication computing platform 110, client portal server 120, client support server 130, and administrative computing device 140 may be associated with an organization (e.g., a financial institution), and private network 195 may be associated with and/or operated by the organization, and may include one or more networks (e.g., LANs, WANs, virtual private networks (VPNs), or the like) that interconnect client authentication computing platform 110, client portal server 120, client support server 130, and administrative computing device 140 and one or more other computing devices and/or computer systems that are used by, operated by, and/or otherwise associated with the organization. Public network 190 may connect private network 195 and/or one or more computing devices connected thereto (e.g., client authentication computing platform 110, client portal server 120, client support server 130, and administrative computing device 140) with one or more networks and/or computing devices that are not associated with the organization. For example, social messaging server 150, client computing device 160, client computing device 170, and client computing device 180 might not be associated with an organization that operates private network 195 (e.g., because social messaging server 150, client computing device 160, client computing device 170, and client computing device 180 may be owned, operated, and/or serviced by one or more entities different from the organization that operates private network 195, such as one or more customers of the organization and/or vendors of the organization, rather than being owned and/or operated by the organization itself or an employee or affiliate of the organization), and public network 190 may include one or more networks (e.g., the internet) that connect social messaging server 150, client computing device 160, client computing device 170, and client computing device 180 to private network 195 and/or one or more computing devices connected thereto (e.g., client authentication computing platform 110, client portal server 120, client support server 130, and administrative computing device 140).

Referring to FIG. 1B, client authentication computing platform 110 may include one or more processors 111, memory 112, and communication interface 115. A data bus may interconnect processor(s) 111, memory 112, and communication interface 115. Communication interface 115 may be a network interface configured to support communication between client authentication computing platform 110 and one or more networks (e.g., private network 195, public network 190, or the like). Memory 112 may include one or more program modules having instructions that when executed by processor(s) 111 cause client authentication computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of client authentication computing platform 110 and/or by different computing devices that may form and/or otherwise make up client authentication computing platform 110. For example, memory 112 may have, store, and/or include a client authentication module 113 and a client authentication database 114. Client authentication module 113 may have instructions that direct and/or cause client authentication computing platform 110 to authenticate one or more users and/or devices using tokenized authentication techniques and/or to perform other functions, as discussed in greater detail below. Client authentication database 114 may store information used by client authentication module 113 and/or client authentication computing platform 110 in authenticating one or more users and/or devices using tokenized authentication techniques and/or in performing other functions.

Figure 2A:
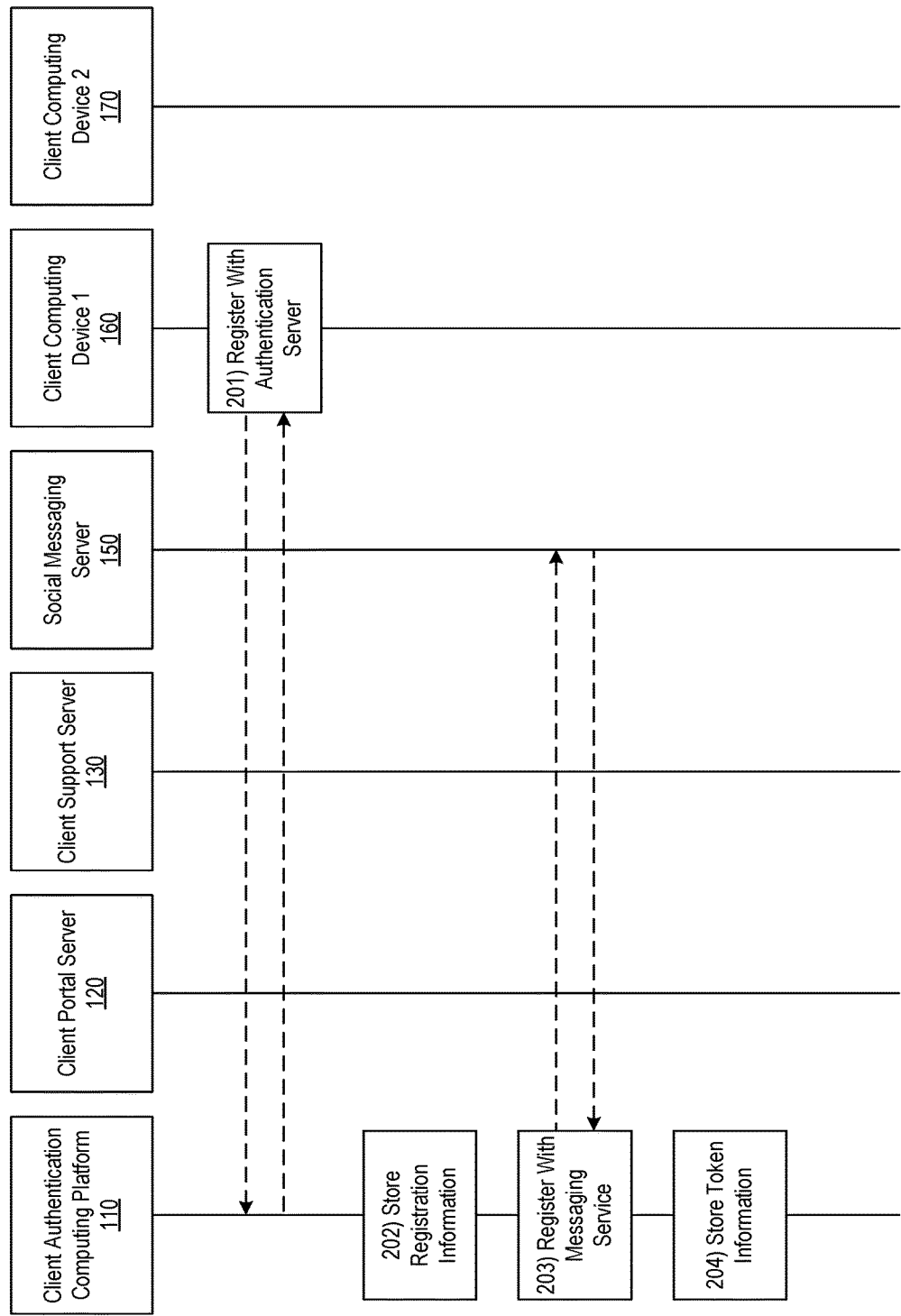

FIGS. 2A-2L depict an illustrative event sequence for preventing unauthorized access to secured information systems using tokenized authentication techniques in accordance with one or more example embodiments. Referring to FIG. 2A, at step 201, client computing device 160 may register with client authentication computing platform 110. For example, in registering with client authentication computing platform 110 at step 201, client computing device 160 may send, to client authentication computing platform 110, registration information identifying a specific user account associated with a social messaging service provided by social messaging server 150. The user account may, for example, be linked to and/or used by a user of client computing device 160 for communicating via the social messaging service provided by social messaging server 150. At step 202, client authentication computing platform 110 may store registration information. For example, in storing registration information at step 202, client authentication computing platform 110 may store user account information associated with one or more users of client computing device 160, device information associated with client computing device 160, and/or the like, including some or all of the information received from client computing device 160 (e.g., during registration at step 201).

At step 203, client authentication computing platform 110 may register with social messaging server 150. For example, at step 203, client authentication computing platform 110 may register with social messaging server 150 based on client computing device 160 registering with client authentication computing platform 110, as this may enable client authentication computing platform 110 to obtain and/or exchange user account information, device information, and/or other information associated with client computing device 160 and/or a social messaging service account used by a user of client computing device 160 with social messaging server 150. For instance, in registering with social messaging server 150 at step 203, client authentication computing platform 110 may receive one or more tokens and/or other information from social messaging server 150, and the one or more tokens and/or other information received from social messaging server 150 may be associated with one or more user accounts linked to client computing device 160 (which may, e.g., include a client portal user account associated with client portal server 120 and linked to client computing device 160, as well as a social messaging service user account associated with social messaging server 150 and linked to client computing device 160).

At step 204, client authentication computing platform 110 may store token information. For example, at step 204, client authentication computing platform 110 may store token information that enables client authentication computing platform 110 to authenticate social messaging server 150 and/or enables social messaging server 150 to authenticate client authentication computing platform 110, so that client authentication computing platform 110 and social messaging server 150 are able to exchange information associated with client computing device 160 and/or one or more user accounts linked to client computing device 160 (e.g., a client portal user account associated with client portal server 120 and linked to client computing device 160, a social messaging service user account associated with social messaging server 150 and linked to client computing device 160). For instance, both client authentication computing platform 110 and social messaging server 150 may maintain tokens enabling them to authenticate each other and individual users to secured sessions. In some instances, client authentication computing platform 110 and social messaging server 150 may utilize OAUTH standards, and one or more tokens generated and/or maintained by client authentication computing platform 110 and/or social messaging server 150 may be defined in accordance with OAUTH standards.

Figure 2B:
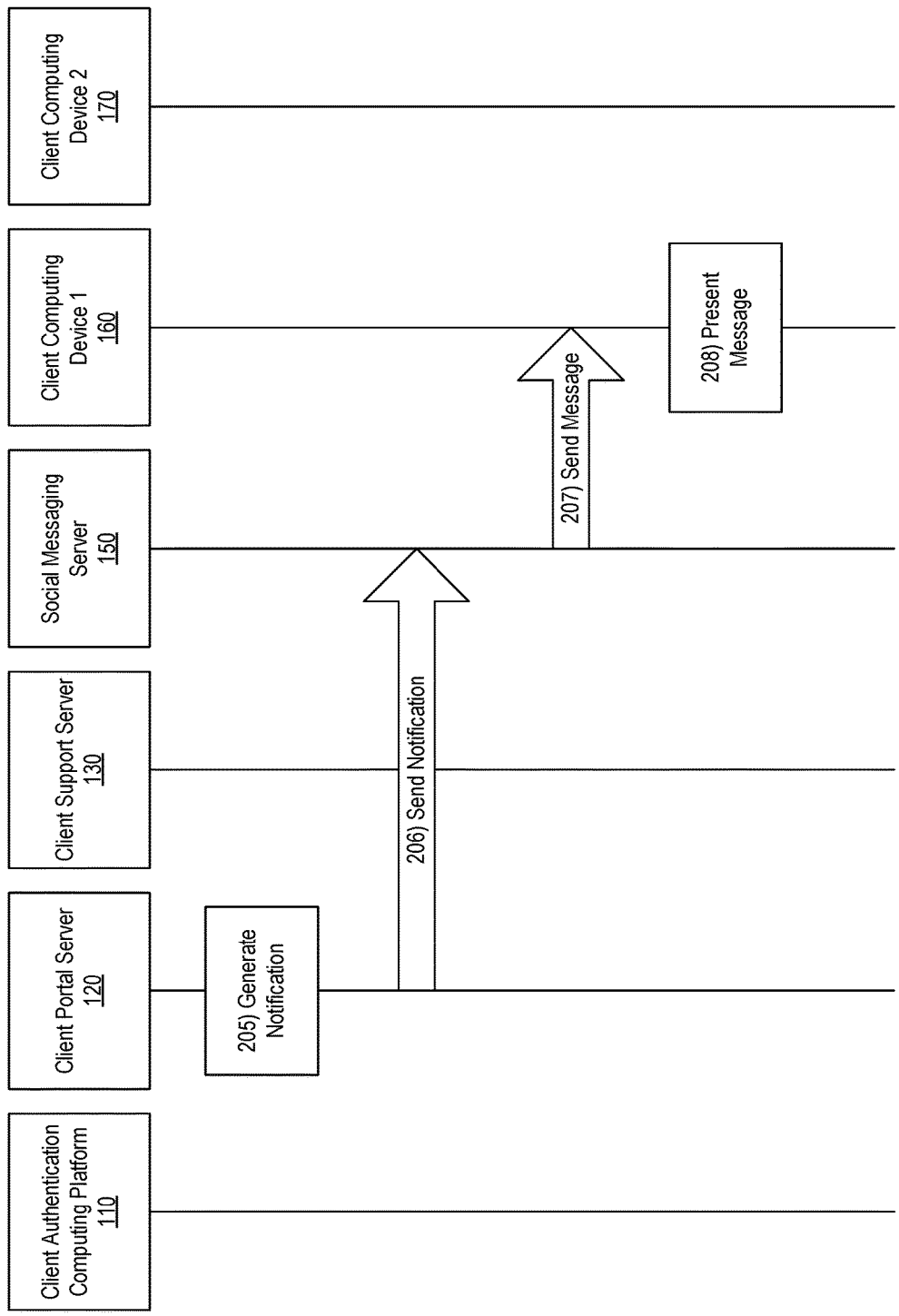

Referring to FIG. 2B, at step 205, client portal server 120 may generate a notification. For example, in generating a notification at step 205, client portal server 120 may generate a client alert for client computing device 160 and/or a client portal user account linked to client computing device 160. The client alert generated by client portal server 120 for client computing device 160 and/or the client portal user account linked to client computing device 160 may, for instance, include information indicating that one or more new account statements and/or other documents are available, one or more special offers are available, unusual account activity has been detected, and/or the like. At step 206, client portal server 120 may send the notification to social messaging server 150 (e.g., based on one or more user preferences associated with the client portal user account linked to client computing device 160 indicating that one or more notifications should be sent to client computing device 160 via a social messaging service provided by social messaging server 150). At step 207, social messaging server 150 may send a message to client computing device 160. For example, at step 207, social messaging server 150 may send a message to client computing device 160 via a social messaging service provided by social messaging server 150, and the message may include the notification generated by and received from client portal server 120.

Figure 3:
FIGS. 3-6 depict example graphical user interfaces for preventing unauthorized access to secured information systems using tokenized authentication techniques in accordance with one or more example embodiments.

At step 208, client computing device 160 may present the message received from social messaging server 150. For example, in presenting the message received from social messaging server 150 at step 208, client computing device 160 may display and/or otherwise present a graphical user interface similar to graphical user interface 300, which is illustrated in FIG. 3. As seen in FIG. 3, graphical user interface 300 may be a chat interface associated with a social messaging service provided by social messaging server 150. For example, graphical user interface 300 may include information identifying the source of the message (e.g., "New Message from Company 1"), as well as the content of the notification received from client portal server 120 (e.g., "Hello, <First1 Last1>! We wanted to let you know that your most recent statement is now available. Please click here to access your documents" and "If you have any questions, please respond to this message, and we will assist you"). In addition, graphical user interface 300 may include one or more controls and/or other elements enabling a user of graphical user interface 300 and/or client computing device 160 to respond to the message (e.g., a message text entry field, a send button, and/or the like).

Figure 2C:
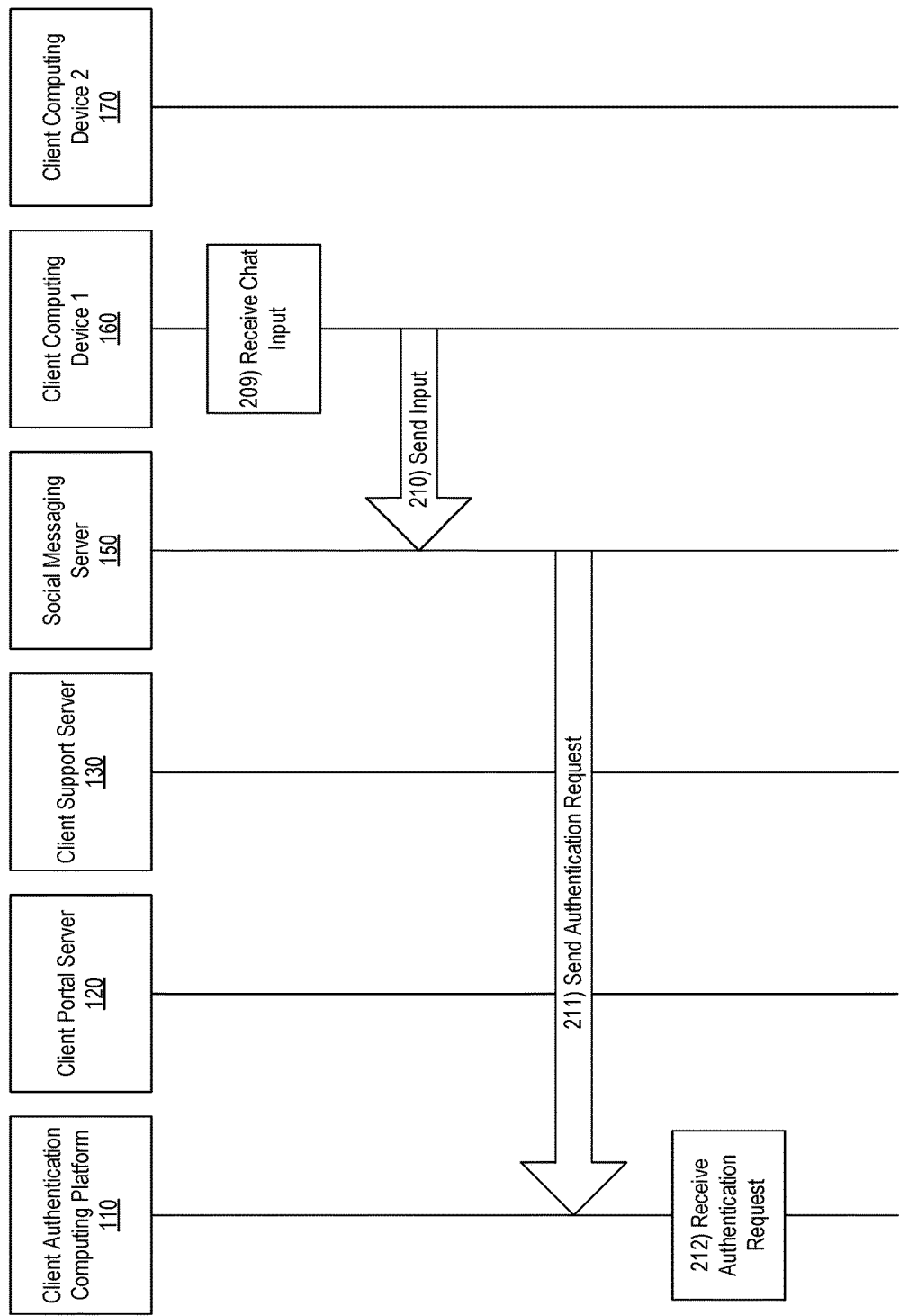

Referring to FIG. 2C, at step 209, client computing device 160 may receive chat input. For example, at step 209, client computing device 160 may receive chat input from the user of client computing device 160 responding to the message presented by client computing device 160 at step 208. As illustrated in greater detail below, the user of client computing device 160 may respond to the message received from social messaging server 150 to dynamically start a chat session with a client support representative of an organization (e.g., a financial institution) operating client authentication computing platform 110 and/or client portal server 120. At step 210, client computing device 160 may send the chat input to social messaging server 150.

At step 211, social messaging server 150 may send an authentication request to client authentication computing platform 110. For example, at step 211, social messaging server 150 may send, to client authentication computing platform 110, an authentication request identifying client computing device 160 and/or a social messaging service user account linked to client computing device 160 based on receiving the chat input from client computing device 160. Client computing device 160 and/or the user of client computing device 160 may, for instance, already be authenticated to the social messaging service user account linked to client computing device 160 and used by the user of client computing device 160 to communicate via the social messaging service provided by social messaging server 150.

At step 212, client authentication computing platform 110 may receive the authentication request from social messaging server 150. For example, at step 212, client authentication computing platform 110 may receive, via the communication interface (e.g., communication interface 115), and from a social messaging server (e.g., social messaging server 150), a request to authenticate a first user to a first user account associated with a client portal provided by a client portal server (e.g., client portal server 120).

In some embodiments, the social messaging server may generate the request to authenticate the first user to the first user account associated with the client portal provided by the client portal server based on receiving chat input from a first client computing device associated with the first user. For example, the social messaging server (e.g., social messaging server 150) may generate the request to authenticate the first user to the first user account associated with the client portal provided by the client portal server (e.g., client portal server 120) based on receiving chat input from a first client computing device associated with the first user (e.g., client computing device 160), as illustrated in the example event sequence.

Figure 2D:
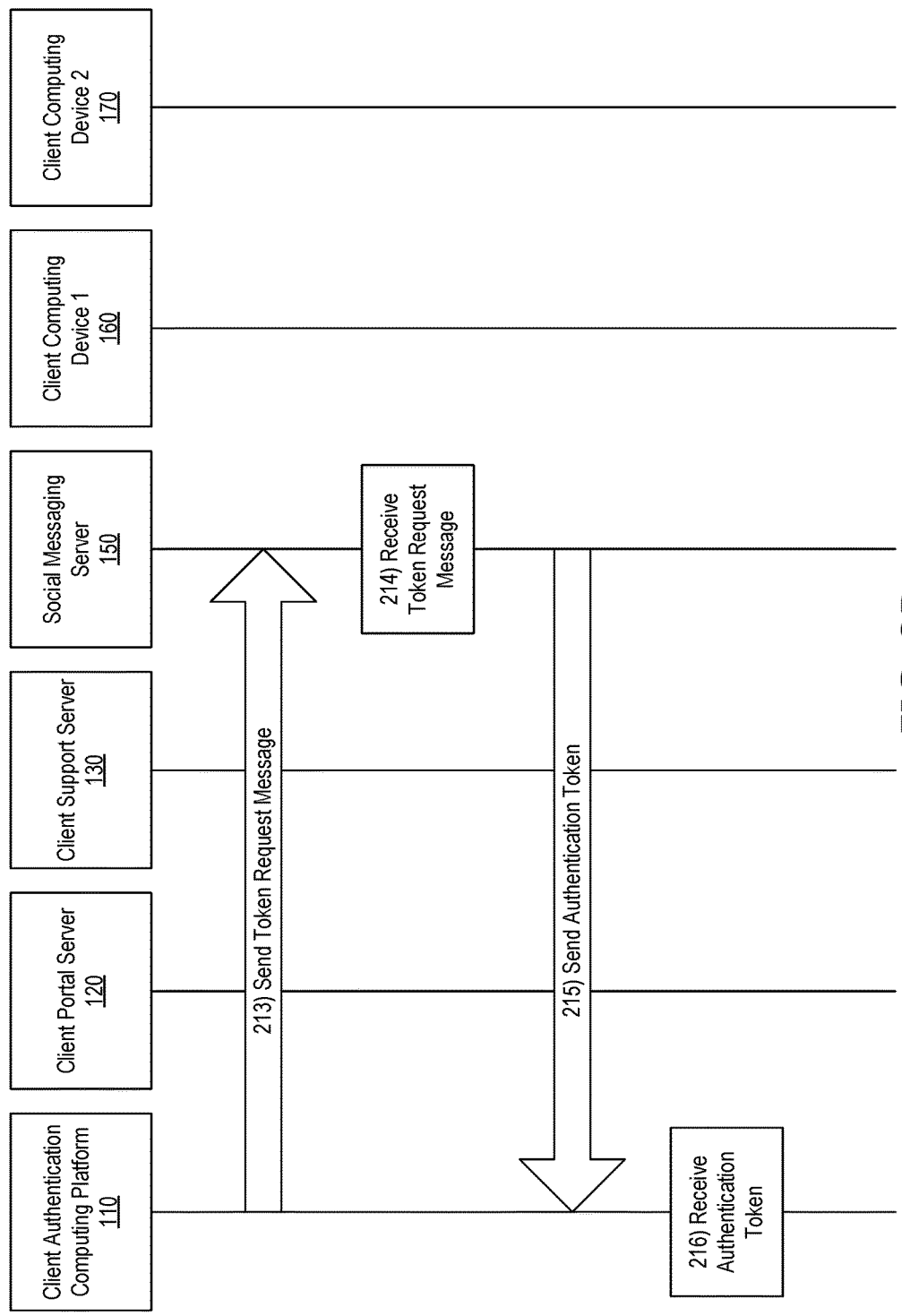

Referring to FIG. 2D, at step 213, client authentication computing platform 110 may send a token request message to social messaging server 150. For example, at step 213, based on receiving the request to authenticate the first user to the first user account associated with the client portal provided by the client portal server (e.g., client portal server 120), client authentication computing platform 110 may send, via the communication interface (e.g., communication interface 115), and to the social messaging server (e.g., social messaging server 150), a first authentication token request message. The authentication token request message may, for instance, request a session token from social messaging server 150. In some instances, the session token requested from social messaging server 150 by client authentication computing platform 110 may be an access token that is created and/or formulated (e.g., by social messaging server 150) based on one or more authentication standards, such as OAUTH standards.

At step 214, social messaging server 150 may receive the token request message from client authentication computing platform 110. At step 215, social messaging server 150 may send an authentication token to client authentication computing platform 110 (e.g., in response to the token request message received from client authentication computing platform 110 at step 214). For example, at step 215, social messaging server 150 may send an authentication token to client authentication computing platform 110 that enables client authentication computing platform 110 to authenticate a user of the social messaging service provided by social messaging server 150 in connection with a specific social messaging service session so as to provide the user with access to one or more resources (e.g., maintained by client authentication computing platform 110, client portal server 120, and/or client support server 130) in a specific client portal session and/or client support session. In this way, and as illustrated in greater detail below, the user's authentication status with respect to a social messaging user account on the social messaging service provided by social messaging server 150 may be carried over to a client support session (which may, e.g., be provided by client support server 130) involving the user's client portal user account (which may, e.g., be used by the user to access to a client portal provided by client portal server 120).

At step 216, client authentication computing platform 110 may receive the authentication token from social messaging server 150. For example, at step 216, client authentication computing platform 110 may receive, via the communication interface (e.g., communication interface 115), and from the social messaging server (e.g., social messaging server 150), a first authentication token. The authentication token (which may, e.g., be received by client authentication computing platform 110 at step 216) may, for instance, be a session token and/or may include information identifying a social messaging service user account associated with the authentication request (e.g., identifying a social messaging service user account associated with client computing device 160), information identifying a client portal user account associated with the authentication request (e.g., identifying a client portal user account associated with client computing device 160), information identifying a device associated with the authentication request (e.g., identifying client computing device 160, such as a device name, device identifier, network address, and/or the like), one or more keys, certificates, and/or unique identifiers, and/or other information.

In some embodiments, the first authentication token received from the social messaging server may include information indicating that the first user is authenticated to a first social messaging service account associated with a social messaging service provided by the social messaging server. For example, the first authentication token received from the social messaging server (e.g., social messaging server 150) may include information indicating that the first user is authenticated to a first social messaging service account associated with a social messaging service provided by the social messaging server (e.g., social messaging server 150).

Figure 2E:
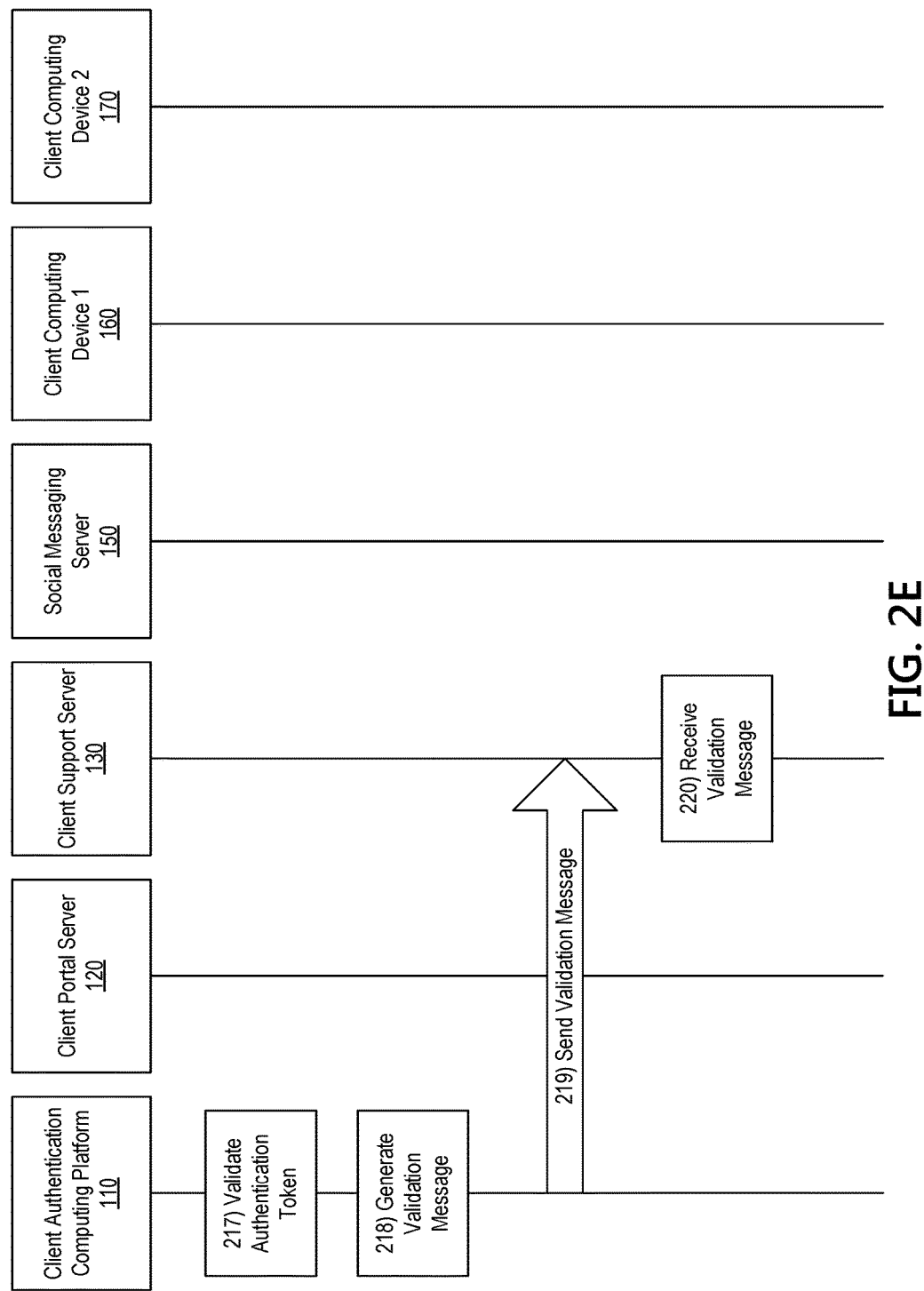

Referring to FIG. 2E, at step 217, client authentication computing platform 110 may validate the authentication token received from social messaging server 150. For example, at step 217, client authentication computing platform 110 may validate the first authentication token received from the social messaging server (e.g., social messaging server 150). In validating the first authentication token received from the social messaging server (e.g., social messaging server 150), client authentication computing platform 110 may, for instance, determine whether and/or confirm that the first authentication token received from the social messaging server (e.g., social messaging server 150) is valid based on the contents of the first authentication token received from the social messaging server (e.g., social messaging server 150). If client authentication computing platform 110 determines that the first authentication token received from the social messaging server (e.g., social messaging server 150) is not valid, client authentication computing platform 110 may generate and/or send one or more error messages, and the event sequence may end. Otherwise, if client authentication computing platform 110 determines that the first authentication token received from the social messaging server (e.g., social messaging server 150) is valid, the example event sequence may continue as illustrated.

At step 218, client authentication computing platform 110 may generate a validation message (e.g., based on validating the authentication token received from social messaging server 150 at step 217). For example, at step 218, based on validating the first authentication token received from the social messaging server (e.g., social messaging server 150), client authentication computing platform 110 may generate a first validation message directing a client support server (e.g., client support server 130) to provide the first user with access to the first user account. As illustrated in greater detail below, the validation message directing the client support server (e.g., client support server 130) to provide the user with access to the user account (which may, e.g., be generated by client authentication computing platform 110 and sent by client authentication computing platform 110 to client support server 130) may cause the client support server (e.g., client support server 130) to initiate a client support session with the user via the social messaging service provided by the social messaging server (e.g., social messaging server 150).

In some embodiments, the first validation message directing the client support server to provide the first user with access to the first user account may include information indicating that the first user has been authenticated to the first user account based on the first authentication token received from the social messaging server. For example, the first validation message directing the client support server (e.g., client support server 130) to provide the first user with access to the first user account may include information indicating that the first user has been authenticated to the first user account based on the first authentication token received from the social messaging server (e.g., social messaging server 150).

In some embodiments, the first validation message directing the client support server to provide the first user with access to the first user account may include information directing the client support server to initiate a first client support session with the first user via the social messaging service provided by the social messaging server. For example, the first validation message directing the client support server (e.g., client support server 130) to provide the first user with access to the first user account may include information directing the client support server (e.g., client support server 130) to initiate a first client support session with the first user via the social messaging service provided by the social messaging server (e.g., social messaging server 150).

At step 219, client authentication computing platform 110 may send the validation message to client support server 130. For example, at step 219, client authentication computing platform 110 may send, via the communication interface (e.g., communication interface 115), and to the client support server (e.g., client support server 130), the first validation message directing the client support server (e.g., client support server 130) to provide the first user with access to the first user account. In directing the client support server (e.g., client support server 130) to provide the user with access to the user account, the validation message generated and sent by client authentication computing platform 110 to the client support server (e.g., client support server 130) may also direct the client support server (e.g., client support server 130) to initiate a client support session with the user via the social messaging service provided by the social messaging server (e.g., social messaging server 150).

Figure 2F:
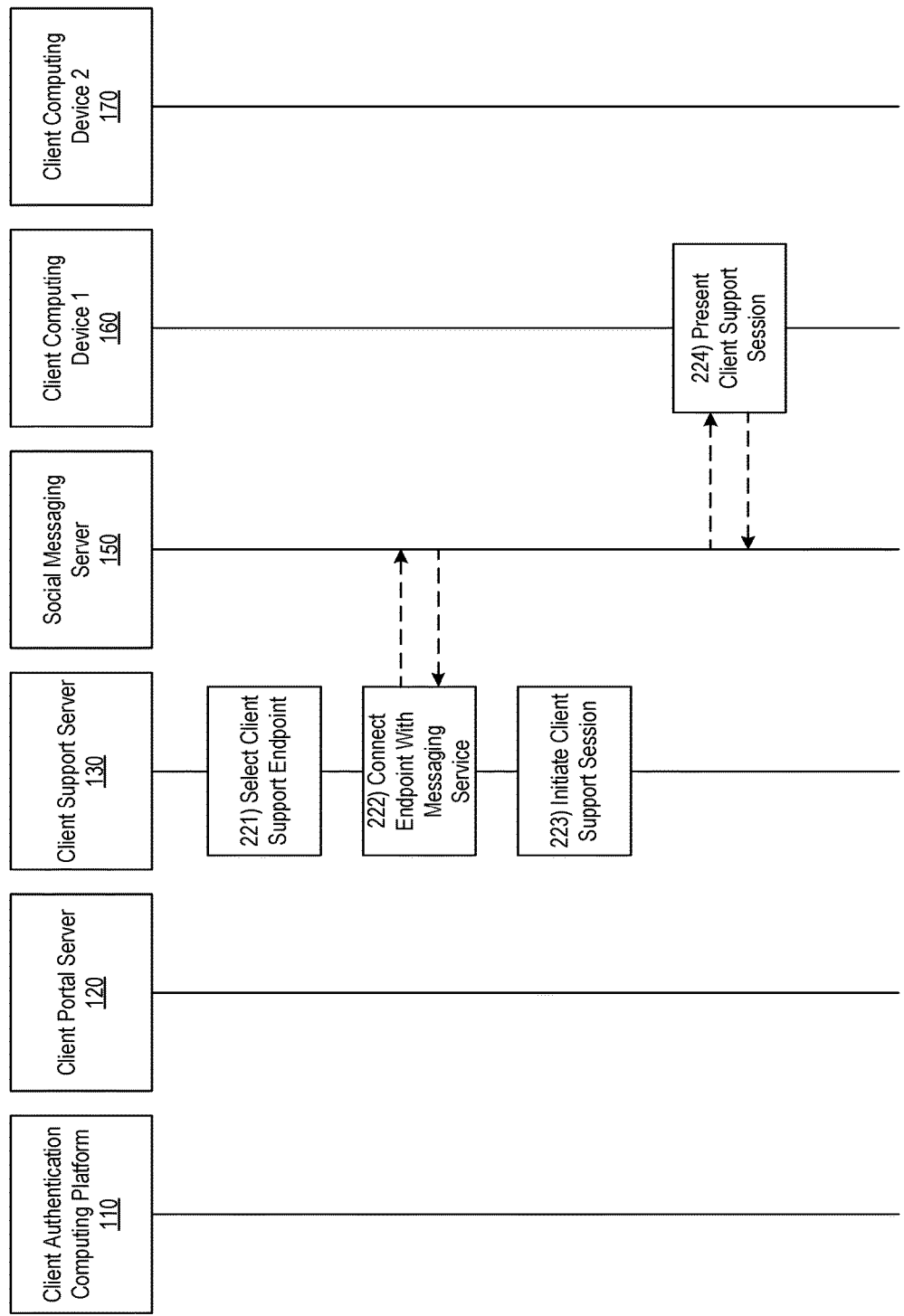

At step 220, client support server 130 may receive the validation message from client authentication computing platform 110. Referring to FIG. 2F, at step 221, client support server 130 may select a client support endpoint (e.g., based on receiving the validation message from client authentication computing platform 110). For instance, client support server 130 may select a particular client support computing device and/or a particular client support representative associated with a particular client support computing device for initiating a client support session with the user of client computing device 160 via the social messaging service provided by the social messaging server (e.g., social messaging server 150). At step 222, client support server 130 may connect the selected client support endpoint with social messaging server 150. For example, at step 222, client support server 130 may connect the selected client support endpoint with social messaging server 150 by establishing one or more network connections between the selected client support endpoint and social messaging server 150.

At step 223, client support server 130 may initiate a client support session. For example, at step 223, client support server 130 may initiate a client support session by directing and/or connecting the selected client support endpoint to a specific chat session associated with client computing device 160 and/or a user account linked to client computing device 160 via the social messaging service provided by the social messaging server (e.g., social messaging server 150). For instance, client support server 130 may direct and/or connect the selected client support endpoint to the chat session initiated when the user of client computing device 160 responded to the message presented at step 208 with the chat input received by social messaging server 150 at step 210.

Figure 4:

At step 224, client computing device 160 may present one or more user interfaces and/or other information associated with the client support session. For example, in presenting one or more user interfaces and/or other information associated with the client support session at step 224, client computing device 160 may display and/or otherwise present a graphical user interface similar to graphical user interface 400, which is illustrated in FIG. 4. As seen in FIG. 4, graphical user interface 400 may be a chat interface associated with a social messaging service provided by social messaging server 150. For example, graphical user interface 400 may include information identifying the chat (e.g., "Chat with Company 1") as well as the chat messages that may comprise the contents of the client support session (e.g., "Hi, I have a question about my statement" and "Hello <First1>. I'm<First2>. How can I help you today?"). In addition, graphical user interface 400 may include one or more controls and/or other elements enabling a user of graphical user interface 400 and/or client computing device 160 to provide chat input to participate in the client support session and/or otherwise respond to messages received from the selected client support endpoint via the social messaging service provided by social messaging server 150 (e.g., a message text entry field, a send button, and/or the like).

Subsequently, one or more steps of the event sequence discussed above may be repeated by client authentication computing platform 110 and/or the other systems discussed above in authenticating another user to another user account associated with the client portal provided by client portal server 120. Although such steps are illustrated separately and following the steps performed with respect to authenticating the first user, various steps may be performed in a different order, such that client authentication computing platform 110 may, for instance, authenticate multiple users simultaneously as social messaging server 150 receives chat input from different users and/or devices responding to different notifications and/or messages originating from client portal server 120 and/or sent via the social messaging service provided by social messaging server 150.

Figure 2G:
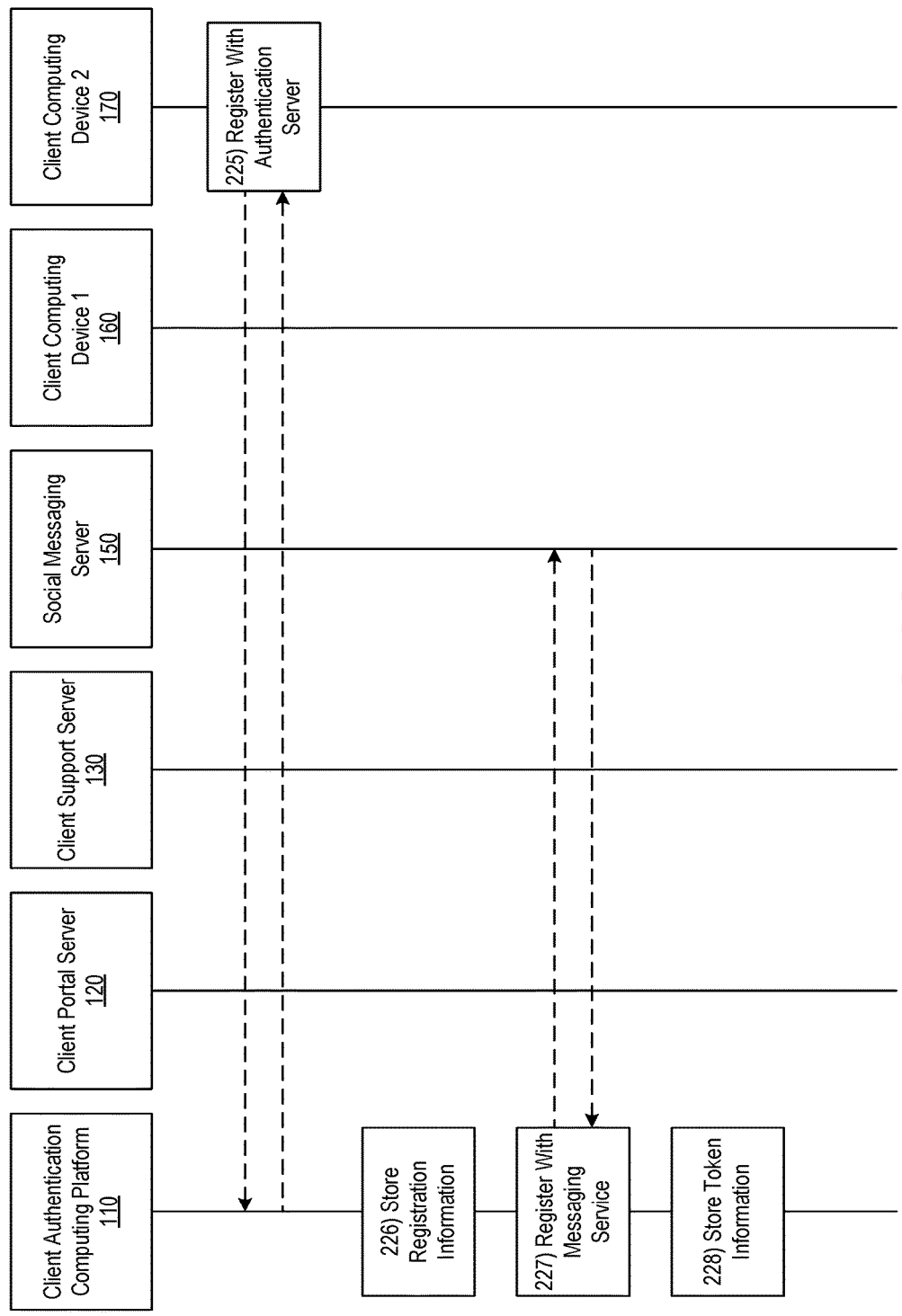

Referring to FIG. 2G, at step 225, client computing device 170 may register with client authentication computing platform 110. For example, in registering with client authentication computing platform 110 at step 225, client computing device 170 may send, to client authentication computing platform 110, registration information identifying a specific user account associated with the social messaging service provided by social messaging server 150. The user account may, for example, be linked to and/or used by a user of client computing device 170 for communicating via the social messaging service provided by social messaging server 150. At step 226, client authentication computing platform 110 may store registration information. For example, in storing registration information at step 226, client authentication computing platform 110 may store user account information associated with one or more users of client computing device 170, device information associated with client computing device 170, and/or the like, including some or all of the information received from client computing device 170 (e.g., during registration at step 225).

At step 227, client authentication computing platform 110 may register with social messaging server 150. For example, at step 227, client authentication computing platform 110 may register with social messaging server 150 based on client computing device 170 registering with client authentication computing platform 110, as this may enable client authentication computing platform 110 to obtain and/or exchange user account information, device information, and/or other information associated with client computing device 170 and/or a social messaging service account used by a user of client computing device 170 with social messaging server 150. For instance, in registering with social messaging server 150 at step 227, client authentication computing platform 110 may receive one or more tokens and/or other information from social messaging server 150, and the one or more tokens and/or other information received from social messaging server 150 may be associated with one or more user accounts linked to client computing device 170 (which may, e.g., include a client portal user account associated with client portal server 120 and linked to client computing device 170, as well as a social messaging service user account associated with social messaging server 150 and linked to client computing device 170).

At step 228, client authentication computing platform 110 may store token information. For example, at step 228, client authentication computing platform 110 may store token information that enables client authentication computing platform 110 to authenticate social messaging server 150 and/or enables social messaging server 150 to authenticate client authentication computing platform 110, so that client authentication computing platform 110 and social messaging server 150 are able to exchange information associated with client computing device 170 and/or one or more user accounts linked to client computing device 170 (e.g., a client portal user account associated with client portal server 120 and linked to client computing device 170, a social messaging service user account associated with social messaging server 150 and linked to client computing device 170). For instance, both client authentication computing platform 110 and social messaging server 150 may maintain tokens enabling them to authenticate each other and individual users to secured sessions. In some instances, client authentication computing platform 110 and social messaging server 150 may utilize OAUTH standards, and one or more tokens generated and/or maintained by client authentication computing platform 110 and/or social messaging server 150 may be defined in accordance with OAUTH standards.

Figure 2H:
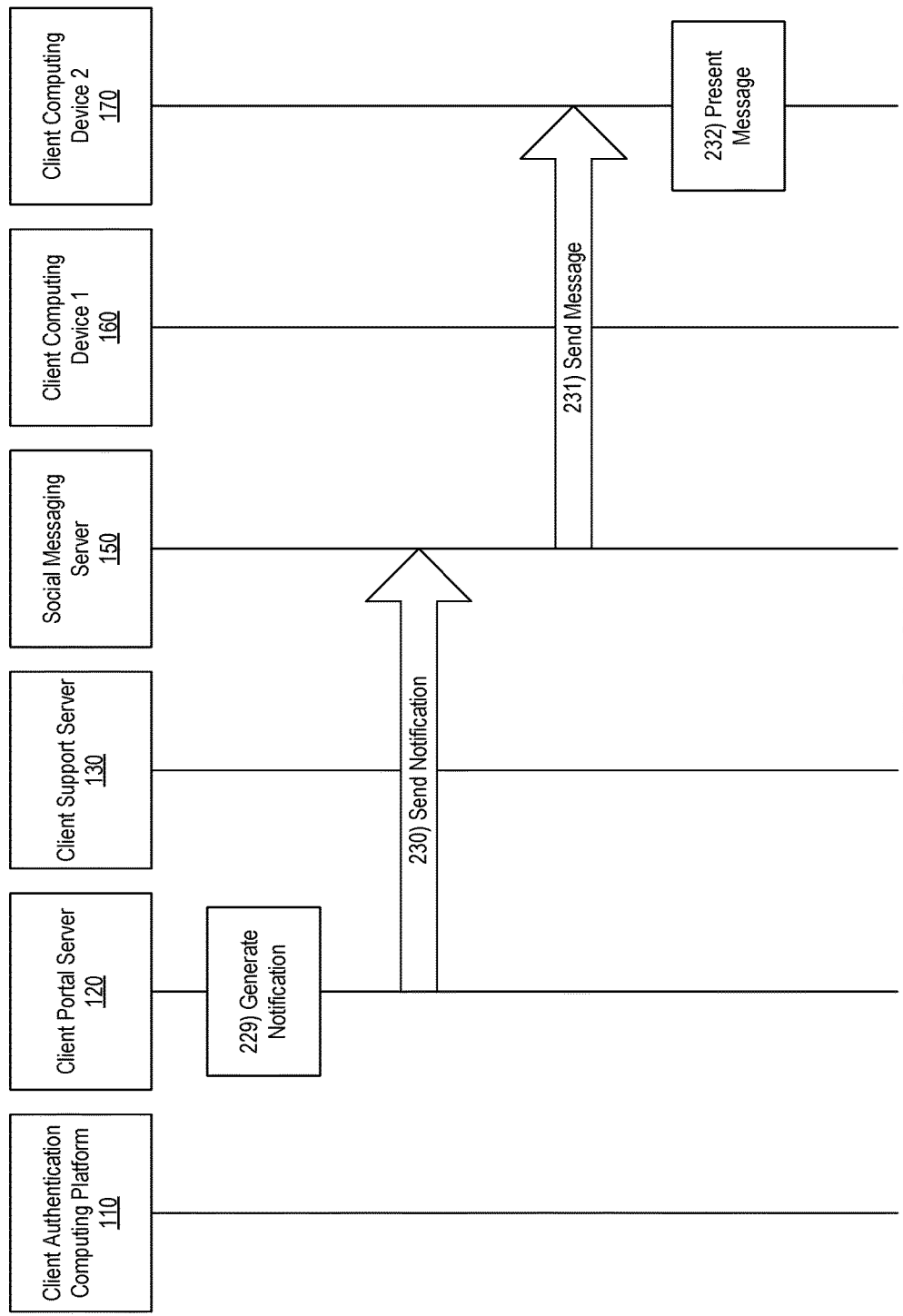

Referring to FIG. 2H, at step 229, client portal server 120 may generate a notification. For example, in generating a notification at step 229, client portal server 120 may generate a client alert for client computing device 170 and/or a client portal user account linked to client computing device 170. The client alert generated by client portal server 120 for client computing device 170 and/or the client portal user account linked to client computing device 170 may, for instance, include information indicating that one or more new account statements and/or other documents are available, one or more special offers are available, unusual account activity has been detected, and/or the like. At step 230, client portal server 120 may send the notification to social messaging server 150 (e.g., based on one or more user preferences associated with the client portal user account linked to client computing device 170 indicating that one or more notifications should be sent to client computing device 170 via a social messaging service provided by social messaging server 150). At step 231, social messaging server 150 may send a message to client computing device 170. For example, at step 231, social messaging server 150 may send a message to client computing device 170 via a social messaging service provided by social messaging server 150, and the message may include the notification generated by and received from client portal server 120.

Figure 5:

At step 232, client computing device 170 may present the message received from social messaging server 150. For example, in presenting the message received from social messaging server 150 at step 232, client computing device 170 may display and/or otherwise present a graphical user interface similar to graphical user interface 500, which is illustrated in FIG. 5. As seen in FIG. 5, graphical user interface 500 may be a chat interface associated with a social messaging service provided by social messaging server 150. For example, graphical user interface 500 may include information identifying the source of the message (e.g., "New Message from Company 1"), as well as the content of the notification received from client portal server 120 (e.g., "Hello, <First2 Last2>! We wanted to let you know that a new special offer is now available. Please click here to learn more" and "If you have any questions, please respond to this message, and we will assist you"). In addition, graphical user interface 500 may include one or more controls and/or other elements enabling a user of graphical user interface 500 and/or client computing device 170 to respond to the message (e.g., a message text entry field, a send button, and/or the like).

Referring to FIG. 2I, at step 232, client computing device 170 may receive chat input. For example, at step 232, client computing device 170 may receive chat input from the user of client computing device 170 responding to the message presented by client computing device 170 at step 232. As illustrated in greater detail below, the user of client computing device 170 may respond to the message received from social messaging server 150 to dynamically start a chat session with a client support representative of an organization (e.g., a financial institution) operating client authentication computing platform 110 and/or client portal server 120. At step 234, client computing device 170 may send the chat input to social messaging server 150.

At step 235, social messaging server 150 may send an authentication request to client authentication computing platform 110. For example, at step 235, social messaging server 150 may send, to client authentication computing platform 110, an authentication request identifying client computing device 170 and/or a social messaging service user account linked to client computing device 170 based on receiving the chat input from client computing device 170. Client computing device 170 and/or the user of client computing device 170 may, for instance, already be authenticated to the social messaging service user account linked to client computing device 170 and used by the user of client computing device 170 to communicate via the social messaging service provided by social messaging server 150.

At step 236, client authentication computing platform 110 may receive the authentication request from social messaging server 150. For example, at step 236, client authentication computing platform 110 may receive, via the communication interface (e.g., communication interface 115), and from the social messaging server (e.g., social messaging server 150), a request to authenticate a second user to a second user account associated with the client portal provided by the client portal server (e.g., client portal server 120).

In some embodiments, the social messaging server may generate the request to authenticate the second user to the second user account associated with the client portal provided by the client portal server based on receiving chat input from a second client computing device associated with the second user. For example, the social messaging server (e.g., social messaging server 150) may generate the request to authenticate the second user to the second user account associated with the client portal provided by the client portal server (e.g., client portal server 120) based on receiving chat input from a second client computing device associated with the second user (e.g., client computing device 170), as illustrated in the example event sequence.

Figure 2J:
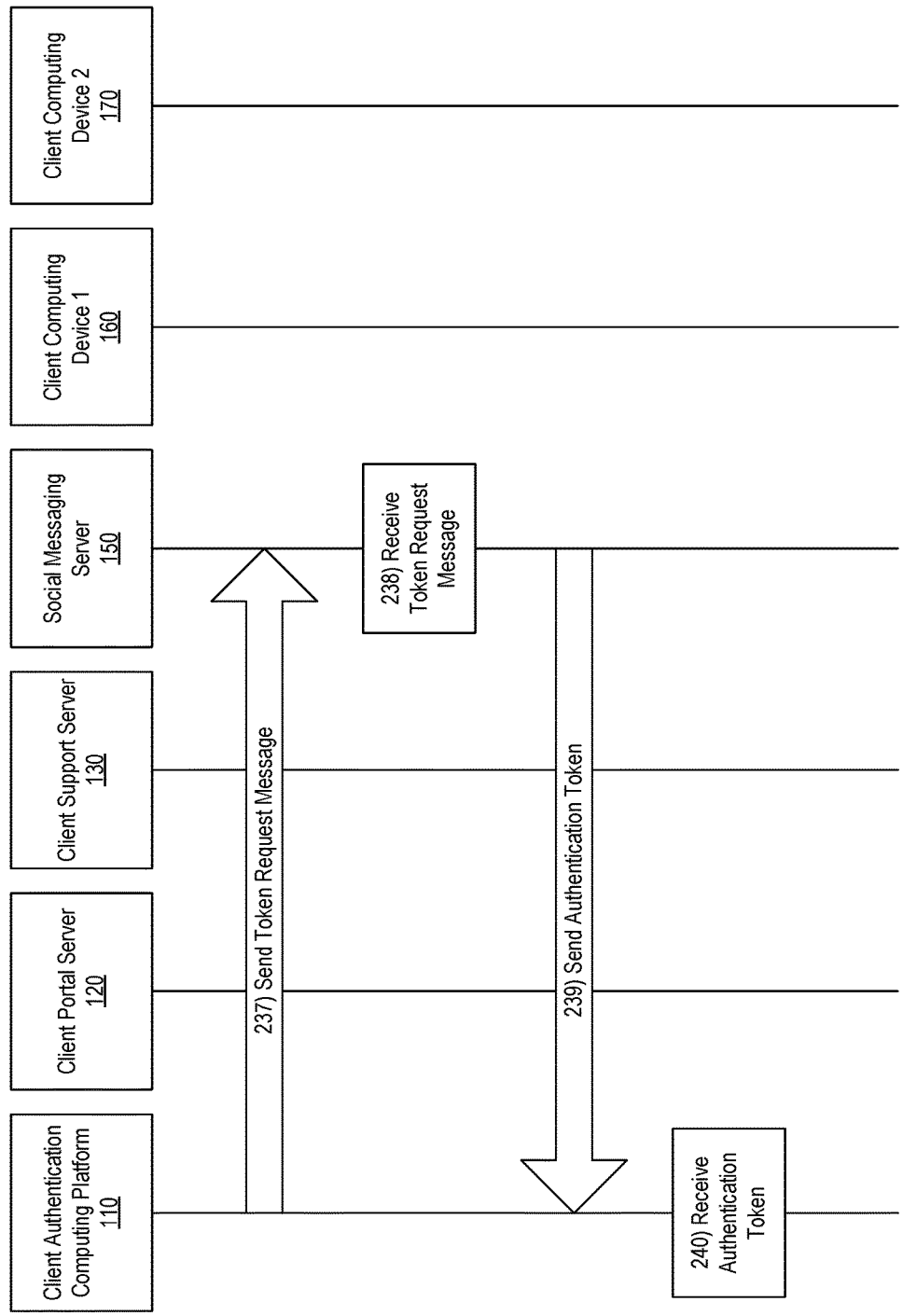

Referring to FIG. 2J, at step 237, client authentication computing platform 110 may send a token request message to social messaging server 150. For example, at step 237, based on receiving the request to authenticate the second user to the second user account associated with the client portal provided by the client portal server (e.g., client portal server 120), client authentication computing platform 110 may send, via the communication interface (e.g., communication interface 115), and to the social messaging server (e.g., social messaging server 150), a second authentication token request message. The authentication token request message may, for instance, request a session token from social messaging server 150. In some instances, the session token requested from social messaging server 150 by client authentication computing platform 110 may be an access token that is created and/or formulated (e.g., by social messaging server 150) based on one or more authentication standards, such as OAUTH standards.

At step 238, social messaging server 150 may receive the token request message from client authentication computing platform 110. At step 239, social messaging server 150 may send an authentication token to client authentication computing platform 110 (e.g., in response to the token request message received from client authentication computing platform 110 at step 238). For example, at step 239, social messaging server 150 may send an authentication token to client authentication computing platform 110 that enables client authentication computing platform 110 to authenticate a user of the social messaging service provided by social messaging server 150 in connection with a specific social messaging service session so as to provide the user with access to one or more resources (e.g., maintained by client authentication computing platform 110, client portal server 120, and/or client support server 130) in a specific client portal session and/or client support session. In this way, and as illustrated in greater detail below, the user's authentication status with respect to a social messaging user account on the social messaging service provided by social messaging server 150 may be carried over to a client support session (which may, e.g., be provided by client support server 130) involving the user's client portal user account (which may, e.g., be used by the user to access to a client portal provided by client portal server 120).

At step 240, client authentication computing platform 110 may receive the authentication token from social messaging server 150. For example, at step 240, client authentication computing platform 110 may receive, via the communication interface (e.g., communication interface 115), and from the social messaging server (e.g., social messaging server 150), a second authentication token. The authentication token (which may, e.g., be received by client authentication computing platform 110 at step 240) may, for instance, be a session token and/or may include information identifying a social messaging service user account associated with the authentication request (e.g., identifying a social messaging service user account associated with client computing device 170), information identifying a client portal user account associated with the authentication request (e.g., identifying a client portal user account associated with client computing device 170), information identifying a device associated with the authentication request (e.g., identifying client computing device 170, such as a device name, device identifier, network address, and/or the like), one or more keys, certificates, and/or unique identifiers, and/or other information.

In some embodiments, the second authentication token received from the social messaging server may include information indicating that the second user is authenticated to a second social messaging service account associated with the social messaging service provided by the social messaging server. For example, the second authentication token received from the social messaging server (e.g., social messaging server 150) may include information indicating that the second user is authenticated to a second social messaging service account associated with the social messaging service provided by the social messaging server (e.g., social messaging server 150).

Referring to FIG. 2K, at step 241, client authentication computing platform 110 may validate the authentication token received from social messaging server 150. For example, at step 241, client authentication computing platform 110 may validate the second authentication token received from the social messaging server (e.g., social messaging server 150). In validating the second authentication token received from the social messaging server (e.g., social messaging server 150), client authentication computing platform 110 may, for instance, determine whether and/or confirm that the second authentication token received from the social messaging server (e.g., social messaging server 150) is valid based on the contents of the second authentication token received from the social messaging server (e.g., social messaging server 150). If client authentication computing platform 110 determines that the second authentication token received from the social messaging server (e.g., social messaging server 150) is not valid, client authentication computing platform 110 may generate and/or send one or more error messages, and the event sequence may end. Otherwise, if client authentication computing platform 110 determines that the second authentication token received from the social messaging server (e.g., social messaging server 150) is valid, the example event sequence may continue as illustrated.

At step 242, client authentication computing platform 110 may generate a validation message (e.g., based on validating the authentication token received from social messaging server 150 at step 241). For example, at step 242, based on validating the second authentication token received from the social messaging server (e.g., social messaging server 150), client authentication computing platform 110 may generate a second validation message directing the client support server (e.g., client support server 130) to provide the second user with access to the second user account. As illustrated in greater detail below, the validation message directing the client support server (e.g., client support server 130) to provide the user with access to the user account (which may, e.g., be generated by client authentication computing platform 110 and sent by client authentication computing platform 110 to client support server 130) may cause the client support server (e.g., client support server 130) to initiate a client support session with the user via the social messaging service provided by the social messaging server (e.g., social messaging server 150).

In some embodiments, the second validation message directing the client support server to provide the second user with access to the second user account may include information indicating that the second user has been authenticated to the second user account based on the second authentication token received from the social messaging server. For example, the second validation message directing the client support server (e.g., client support server 130) to provide the second user with access to the second user account may include information indicating that the second user has been authenticated to the second user account based on the second authentication token received from the social messaging server (e.g., social messaging server 150).

In some embodiments, the second validation message directing the client support server to provide the second user with access to the second user account may include information directing the client support server to initiate a second client support session with the second user via the social messaging service provided by the social messaging server. For example, the second validation message directing the client support server (e.g., client support server 130) to provide the second user with access to the second user account may include information directing the client support server (e.g., client support server 130) to initiate a second client support session with the second user via the social messaging service provided by the social messaging server (e.g., social messaging server 150).

At step 243, client authentication computing platform 110 may send the validation message to client support server 130. For example, at step 243, client authentication computing platform 110 may send, via the communication interface (e.g., communication interface 115), and to the client support server (e.g., client support server 130), the second validation message directing the client support server (e.g., client support server 130) to provide the second user with access to the second user account. In directing the client support server (e.g., client support server 130) to provide the user with access to the user account, the validation message generated and sent by client authentication computing platform 110 to the client support server (e.g., client support server 130) may also direct the client support server (e.g., client support server 130) to initiate a client support session with the user via the social messaging service provided by the social messaging server (e.g., social messaging server 150).

Figure 2L:
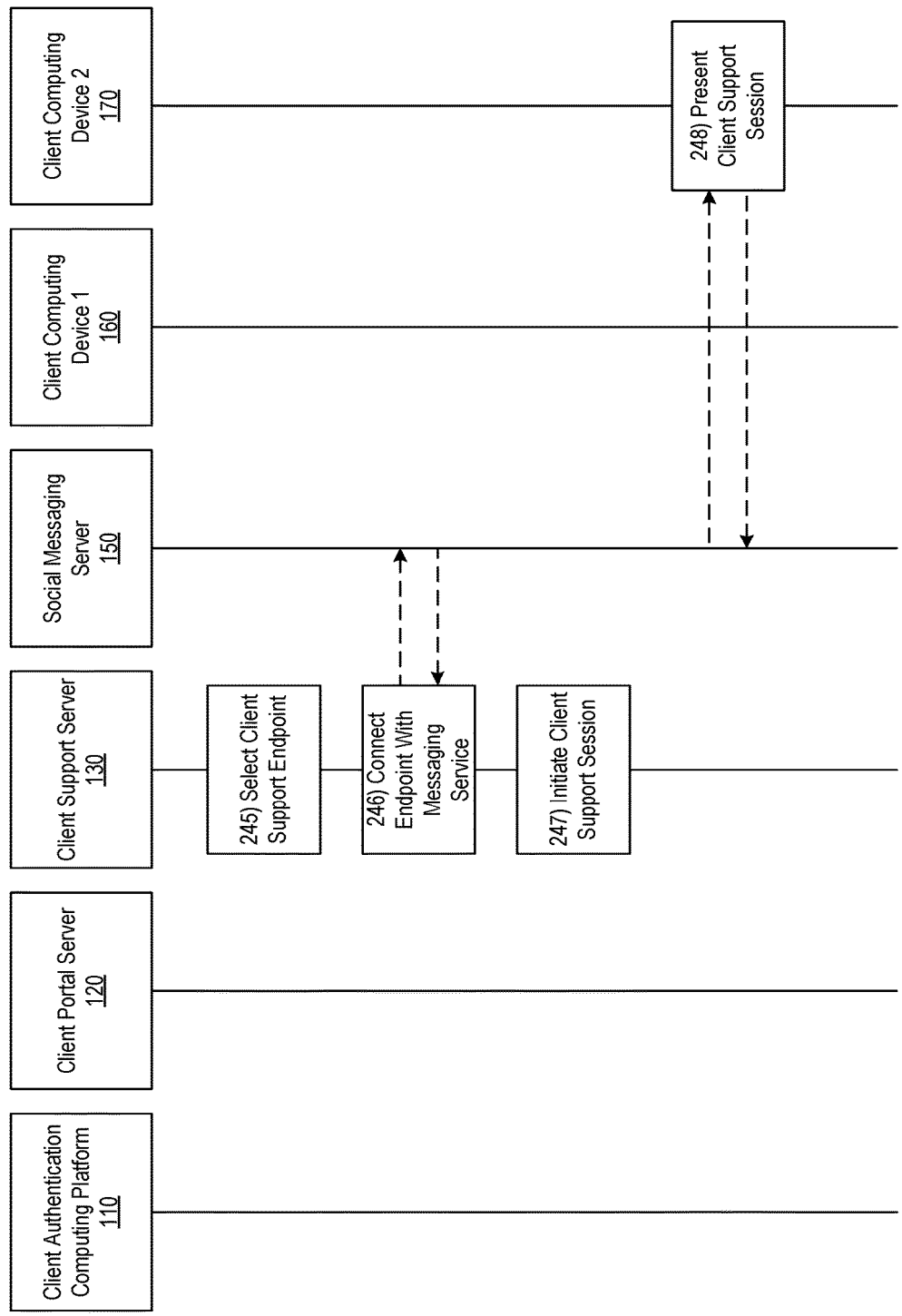

At step 244, client support server 130 may receive the validation message from client authentication computing platform 110. Referring to FIG. 2L, at step 245, client support server 130 may select a client support endpoint (e.g., based on receiving the validation message from client authentication computing platform 110). For instance, client support server 130 may select a particular client support computing device and/or a particular client support representative associated with a particular client support computing device for initiating a client support session with the user of client computing device 170 via the social messaging service provided by the social messaging server (e.g., social messaging server 150). At step 246, client support server 130 may connect the selected client support endpoint with social messaging server 150. For example, at step 246, client support server 130 may connect the selected client support endpoint with social messaging server 150 by establishing one or more network connections between the selected client support endpoint and social messaging server 150.

At step 247, client support server 130 may initiate a client support session. For example, at step 247, client support server 130 may initiate a client support session by directing and/or connecting the selected client support endpoint to a specific chat session associated with client computing device 170 and/or a user account linked to client computing device 170 via the social messaging service provided by the social messaging server (e.g., social messaging server 150). For instance, client support server 130 may direct and/or connect the selected client support endpoint to the chat session initiated when the user of client computing device 170 responded to the message presented at step 232 with the chat input received by social messaging server 150 at step 234.

Figure 6:

At step 248, client computing device 170 may present one or more user interfaces and/or other information associated with the client support session. For example, in presenting one or more user interfaces and/or other information associated with the client support session at step 248, client computing device 170 may display and/or otherwise present a graphical user interface similar to graphical user interface 600, which is illustrated in FIG. 6. As seen in FIG. 6, graphical user interface 600 may be a chat interface associated with a social messaging service provided by social messaging server 150. For example, graphical user interface 600 may include information identifying the chat (e.g., "Chat with Company 1") as well as the chat messages that may comprise the contents of the client support session (e.g., "Hi, I have a question about the offer" and "Hello <First2>. I'm<First3>. How can I help you today?"). In addition, graphical user interface 600 may include one or more controls and/or other elements enabling a user of graphical user interface 600 and/or client computing device 170 to provide chat input to participate in the client support session and/or otherwise respond to messages received from the selected client support endpoint via the social messaging service provided by social messaging server 150 (e.g., a message text entry field, a send button, and/or the like).

Figure 7:
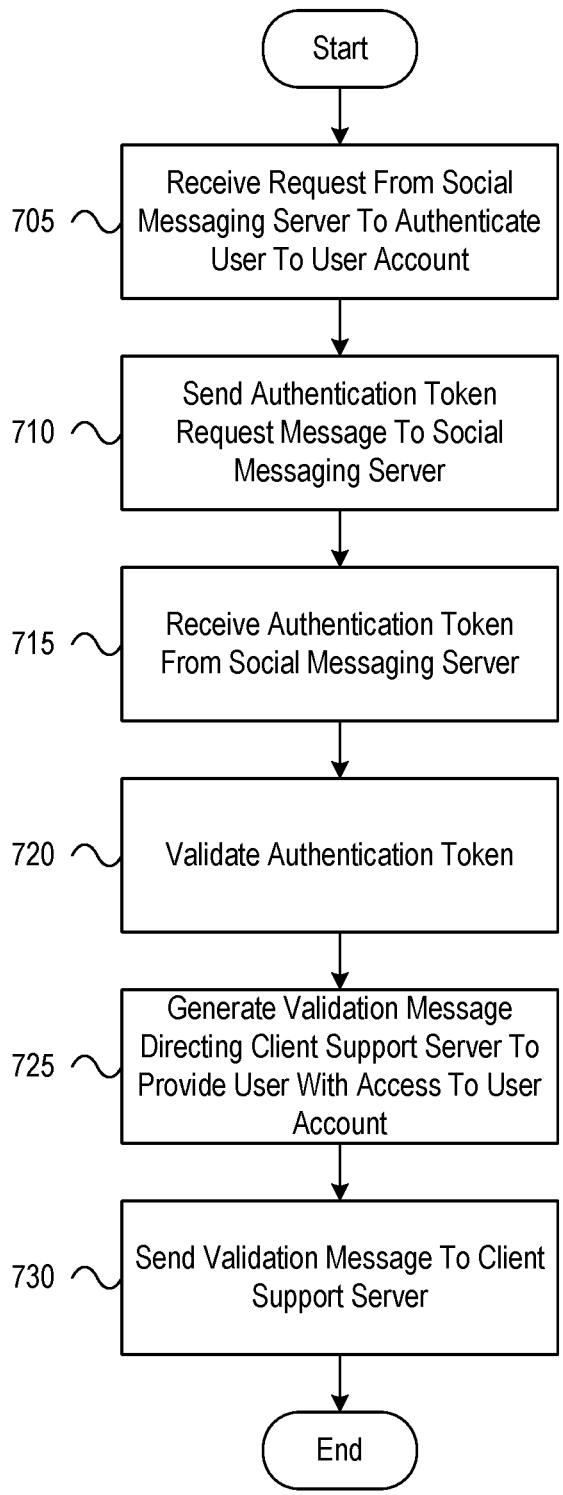
FIG. 7 depicts an illustrative method for preventing unauthorized access to secured information systems using tokenized authentication techniques in accordance with one or more example embodiments.

FIG. 7 depicts an illustrative method for preventing unauthorized access to secured information systems using tokenized authentication techniques in accordance with one or more example embodiments. Referring to FIG. 7, at step 705, a computing platform having at least one processor, a memory, and a communication interface may receive, via the communication interface, and from a social messaging server, a request to authenticate a first user to a first user account associated with a client portal provided by a client portal server. At step 710, based on receiving the request to authenticate the first user to the first user account associated with the client portal provided by the client portal server, the computing platform may send, via the communication interface, and to the social messaging server, a first authentication token request message. At step 715, the computing platform may receive, via the communication interface, and from the social messaging server, a first authentication token. At step 720, the computing platform may validate the first authentication token received from the social messaging server. At step 725, based on validating the first authentication token received from the social messaging server, the computing platform may generate a first validation message directing a client support server to provide the first user with access to the first user account. At step 730, the computing platform may send, via the communication interface, and to the client support server, the first validation message directing the client support server to provide the first user with access to the first user account.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
at least one processor;
a communication interface communicatively coupled to the at least one processor; and
memory storing computer-readable instructions that, when executed by the at least one processor, cause the computing platform to:
receive, via the communication interface, and from a social messaging server, a request to authenticate a first user to a first user account associated with a client portal provided by a client portal server,
wherein the social messaging server generates the request to authenticate the first user to the first user account associated with the client portal provided by the client portal server based on receiving chat input from a first client computing device associated with the first user in response to a message sent by the social messaging server, via a social messaging service provided by the social messaging server, to the first client computing device associated with the first user, based on a notification sent to the social messaging server by the client portal server, and
wherein the social messaging server is operated by a social networking service different from an organization operating the client portal server;
based on receiving the request to authenticate the first user to the first user account associated with the client portal provided by the client portal server, send, via the communication interface, and to the social messaging server, a first authentication token request message;
receive, via the communication interface, and from the social messaging server, a first authentication token;
validate the first authentication token received from the social messaging server;
based on validating the first authentication token received from the social messaging server, generate a first validation message directing a client support server to provide the first user with access to the first user account; and
send, via the communication interface, and to the client support server, the first validation message directing the client support server to provide the first user with access to the first user account.

2. The computing platform of claim 1, wherein the first authentication token received from the social messaging server comprises information indicating that the first user is authenticated to a first social messaging service account associated with the social messaging service provided by the social messaging server.

3. The computing platform of claim 2, wherein the first validation message directing the client support server to provide the first user with access to the first user account comprises information indicating that the first user has been authenticated to the first user account based on the first authentication token received from the social messaging server.

4. The computing platform of claim 3, wherein the first validation message directing the client support server to provide the first user with access to the first user account comprises information directing the client support server to initiate a first client support session with the first user via the social messaging service provided by the social messaging server.

5. The computing platform of claim 4, wherein the memory stores additional computer-readable instructions that, when executed by the at least one processor, cause the computing platform to:
receive, via the communication interface, and from the social messaging server, a request to authenticate a second user to a second user account associated with the client portal provided by the client portal server;
based on receiving the request to authenticate the second user to the second user account associated with the client portal provided by the client portal server, send, via the communication interface, and to the social messaging server, a second authentication token request message;
receive, via the communication interface, and from the social messaging server, a second authentication token;
validate the second authentication token received from the social messaging server;
based on validating the second authentication token received from the social messaging server, generate a second validation message directing the client support server to provide the second user with access to the second user account; and
send, via the communication interface, and to the client support server, the second validation message directing the client support server to provide the second user with access to the second user account.

6. The computing platform of claim 5, wherein the second authentication token received from the social messaging server comprises information indicating that the second user is authenticated to a second social messaging service account associated with the social messaging service provided by the social messaging server.

7. The computing platform of claim 6, wherein the social messaging server generates the request to authenticate the second user to the second user account associated with the client portal provided by the client portal server based on receiving chat input from a second client computing device associated with the second user.

8. The computing platform of claim 6, wherein the second validation message directing the client support server to provide the second user with access to the second user account comprises information indicating that the second user has been authenticated to the second user account based on the second authentication token received from the social messaging server.

9. The computing platform of claim 8, wherein the second validation message directing the client support server to provide the second user with access to the second user account comprises information directing the client support server to initiate a second client support session with the second user via the social messaging service provided by the social messaging server.

10. A method, comprising:
at a computing platform comprising at least one processor, memory, and a communication interface:
receiving, by the at least one processor, via the communication interface, and from a social messaging server, a request to authenticate a first user to a first user account associated with a client portal provided by a client portal server,
wherein the social messaging server generates the request to authenticate the first user to the first user account associated with the client portal provided by the client portal server based on receiving chat input from a first client computing device associated with the first user in response to a message sent by the social messaging server, via a social messaging service provided by the social messaging server, to the first client computing device associated with the first user, based on a notification sent to the social messaging server by the client portal server, and
wherein the social messaging server is operated by a social networking service different from an organization operating the client portal server;
based on receiving the request to authenticate the first user to the first user account associated with the client portal provided by the client portal server, sending, by the at least one processor, via the communication interface, and to the social messaging server, a first authentication token request message;
receiving, by the at least one processor, via the communication interface, and from the social messaging server, a first authentication token;
validating, by the at least one processor, the first authentication token received from the social messaging server;
based on validating the first authentication token received from the social messaging server, generating, by the at least one processor, a first validation message directing a client support server to provide the first user with access to the first user account; and
sending, by the at least one processor, via the communication interface, and to the client support server, the first validation message directing the client support server to provide the first user with access to the first user account.

11. The method of claim 10, wherein the first authentication token received from the social messaging server comprises information indicating that the first user is authenticated to a first social messaging service account associated with the social messaging service provided by the social messaging server.

12. The method of claim 11, wherein the first validation message directing the client support server to provide the first user with access to the first user account comprises information indicating that the first user has been authenticated to the first user account based on the first authentication token received from the social messaging server.

13. The method of claim 12, wherein the first validation message directing the client support server to provide the first user with access to the first user account comprises information directing the client support server to initiate a first client support session with the first user via the social messaging service provided by the social messaging server.

14. The method of claim 13, comprising:
receiving, by the at least one processor, via the communication interface, and from the social messaging server, a request to authenticate a second user to a second user account associated with the client portal provided by the client portal server;

based on receiving the request to authenticate the second user to the second user account associated with the client portal provided by the client portal server, sending, by the at least one processor, via the communication interface, and to the social messaging server, a second authentication token request message;

receiving, by the at least one processor, via the communication interface, and from the social messaging server, a second authentication token;

validating, by the at least one processor, the second authentication token received from the social messaging server;

based on validating the second authentication token received from the social messaging server, generating, by the at least one processor, a second validation message directing the client support server to provide the second user with access to the second user account; and sending, by the at least one processor, via the communication interface, and to the client support server, the second validation message directing the client support server to provide the second user with access to the second user account.

15. The method of claim 14, wherein the second authentication token received from the social messaging server comprises information indicating that the second user is authenticated to a second social messaging service account associated with the social messaging service provided by the social messaging server.

16. The method of claim 15, wherein the social messaging server generates the request to authenticate the second user to the second user account associated with the client portal provided by the client portal server based on receiving chat input from a second client computing device associated with the second user.

17. The method of claim 15, wherein the second validation message directing the client support server to provide the second user with access to the second user account comprises information indicating that the second user has been authenticated to the second user account based on the second authentication token received from the social messaging server.

18. One or more non-transitory computer-readable media storing instructions that, when executed by a computing platform comprising at least one processor, memory, and a communication interface, cause the computing platform to:

receive, via the communication interface, and from a social messaging server, a request to authenticate a first user to a first user account associated with a client portal provided by a client portal server, wherein the social messaging server generates the request to authenticate the first user to the first user account associated with the client portal provided by the client portal server based on receiving chat input from a first client computing device associated with the first user in response to a message sent by the social messaging server, via a social messaging service provided by the social messaging server, to the first client computing device associated with the first user, based on a notification sent to the social messaging server by the client portal server, and wherein the social messaging server is operated by a social networking service different from an organization operating the client portal server;

based on receiving the request to authenticate the first user to the first user account associated with the client portal provided by the client portal server, send, via the communication interface, and to the social messaging server, a first authentication token request message;

receive, via the communication interface, and from the social messaging server, a first authentication token;

validate the first authentication token received from the social messaging server;

based on validating the first authentication token received from the social messaging server, generate a first validation message directing a client support server to provide the first user with access to the first user account; and send, via the communication interface, and to the client support server, the first validation message directing the client support server to provide the first user with access to the first user account.

* * * * *